United States Patent
Raval Contractor et al.

(10) Patent No.: US 11,397,762 B2
(45) Date of Patent: Jul. 26, 2022

(54) AUTOMATICALLY GENERATING NATURAL LANGUAGE RESPONSES TO USERS' QUESTIONS

(71) Applicant: ACCENTURE GLOBAL SOLUTIONS LIMITED, Dublin (IE)

(72) Inventors: Gopali Raval Contractor, Mumbai (IN); Venkatraman Viswanathan, Bangalore (IN); Shiladitya Sengupta, Bangalore (IN); Subhashini Lakshminarayanan, Chennai (IN); Selvakuberan Karuppasamy, Chennai (IN); Shantanu Sahasrabudhe, Mumbai (IN); Jyoti Bishnoi, Bangalore (IN); Kishore Kumar Eswara, Chennai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 303 days.

(21) Appl. No.: 16/752,148

(22) Filed: Jan. 24, 2020

(65) Prior Publication Data

US 2021/0232613 A1    Jul. 29, 2021

(51) Int. Cl.
*G06F 16/332*    (2019.01)
*G06F 40/20*    (2020.01)
(Continued)

(52) U.S. Cl.
CPC .......... *G06F 16/3329* (2019.01); *G06F 40/20* (2020.01); *G06N 5/02* (2013.01); *G06V 30/153* (2022.01); *G06V 30/10* (2022.01)

(58) Field of Classification Search
CPC .... G06F 16/3329; G06F 40/20; G06F 40/284; G06F 40/30; G06F 40/35; G06N 5/02;
(Continued)

(56) References Cited

U.S. PATENT DOCUMENTS

| | | | | |
|---|---|---|---|---|
| 7,823,061 B2 * | 10/2010 | Chan | ...................... | G06F 40/20 715/854 |
| 8,453,102 B1 * | 5/2013 | Pack | .................... | G06F 30/327 716/139 |

(Continued)

FOREIGN PATENT DOCUMENTS

| EP | 1107169 A2 | 6/2001 |
|---|---|---|
| WO | 0157786 | 8/2001 |

(Continued)

OTHER PUBLICATIONS

Harsha Jawagal et al., "Responding To User Queries By Context-Based Intelligent Agents", U.S. Appl. No. 16/781,590, filed Feb. 4, 2020, 58 pages.

(Continued)

*Primary Examiner* — Akwasi M Sarpong
(74) *Attorney, Agent, or Firm* — Mannava & Kang, P.C.

(57) ABSTRACT

A domain-specific question answering system receives an end-user's question, identifies relevant information from domain-specific documents, composes a natural-language based response including the relevant information to be provided to the end-user. A knowledge base includes a domain-specific ontology and is built from data structures configured to preserve the hierarchy of the informational elements within the domain-specific documents. The question received from the end-user is analyzed to extract the features and the key phrases which are used to identify the relevant data structures. A pre-trained model that is further trained on domain-specific data is used to identify the sentences that include information responsive to the question. A response to the end-user's question is composed from the sentences. The question answering system also enables validation of the answers provided to the users' questions.

20 Claims, 17 Drawing Sheets

(51) Int. Cl.
  *G06N 5/02*    (2006.01)
  *G06V 30/148*  (2022.01)
  *G06V 30/10*   (2022.01)

(58) Field of Classification Search
  CPC ...... G06N 3/0445; G06N 3/0454; G06N 3/08;
          G06N 5/022; G06V 30/153; G06V 30/10
  USPC ........................................................ 704/900
  See application file for complete search history.

(56) References Cited

U.S. PATENT DOCUMENTS

| | | | |
|---|---|---|---|
| 8,700,620 B1* | 4/2014 | Lieberman | G06F 16/36 |
| | | | 707/728 |
| 9,336,485 B2* | 5/2016 | Haggar | G06F 16/3344 |
| 10,394,956 B2* | 8/2019 | Zeng | G06N 5/04 |
| 10,678,402 B1* | 6/2020 | Parande | G06F 16/3344 |
| 2004/0249251 A1* | 12/2004 | Olschafskie | A61B 5/0002 |
| | | | 128/920 |
| 2007/0271263 A1* | 11/2007 | Merrild | G06F 16/9027 |
| 2012/0078902 A1* | 3/2012 | Duboue | G06F 16/334 |
| | | | 707/E17.014 |
| 2014/0280087 A1* | 9/2014 | Isensee | G06F 16/248 |
| | | | 707/723 |
| 2015/0356089 A1* | 12/2015 | Jamrog | G06F 16/24578 |
| | | | 707/723 |
| 2015/0356181 A1* | 12/2015 | Dettman | G06F 16/3329 |
| | | | 707/755 |
| 2016/0117314 A1* | 4/2016 | Kantor | G06F 40/205 |
| | | | 704/9 |
| 2016/0314104 A1 | 10/2016 | Phillips | |
| 2016/0314114 A1* | 10/2016 | Barbetta | G06F 16/3326 |
| 2017/0032689 A1* | 2/2017 | Beason | G09B 7/00 |
| 2017/0060945 A1* | 3/2017 | Bastide | G06F 16/24542 |
| 2017/0255609 A1* | 9/2017 | Byron | G06F 40/205 |
| 2018/0107648 A1* | 4/2018 | Ackermann | G06N 20/00 |
| 2018/0137419 A1* | 5/2018 | Byron | G06N 5/022 |
| 2018/0137420 A1* | 5/2018 | Byron | G06F 40/30 |
| 2018/0137527 A1* | 5/2018 | Noelting | G06Q 30/0204 |
| 2018/0137775 A1* | 5/2018 | Byron | G09B 5/02 |
| 2018/0129938 A1 | 10/2018 | Xiong et al. | |
| 2019/0026365 A1* | 1/2019 | Karuppasamy | H04L 41/5074 |
| 2019/0043379 A1 | 2/2019 | Yuan et al. | |
| 2019/0065576 A1* | 2/2019 | Peng | G06F 16/3329 |
| 2019/0340172 A1* | 11/2019 | McElvain | G06N 5/046 |
| 2019/0347341 A1* | 11/2019 | Carr | G06F 16/23 |
| 2020/0133964 A1* | 4/2020 | Lee | G06F 16/355 |
| 2020/0320984 A1 | 10/2020 | Kuczmarski | |
| 2020/0334546 A1* | 10/2020 | Muschett | G06N 5/022 |
| 2021/0019374 A1* | 1/2021 | Donaldson | G06F 40/56 |
| 2021/0065042 A1* | 3/2021 | Gopalan | G06F 40/30 |
| 2021/0149994 A1 | 5/2021 | Kim | |
| 2021/0232613 A1* | 7/2021 | Raval Contractor | G06V 10/82 |
| 2021/0374350 A1* | 12/2021 | Nishida | G06F 40/30 |

FOREIGN PATENT DOCUMENTS

| | | |
|---|---|---|
| WO | 2018/085710 | 5/2018 |
| WO | 2019/211817 | 11/2019 |

OTHER PUBLICATIONS

Semnani et al., "Domain-Specific Question Answering at Scale for Conversational Systems", 33rd Conference on Neural Information Processing Systems (NeurIPS 2019), 10 pages.

Wang et al., "QG-net: a data-driven question generation model for educational content", L@S 2018: Proceedings of the Fifth Annual ACM Conference on Learning at ScaleJune 2018 Article No. 7, pp. 1-10.

Devlin et al., "BERT: Pre-training of Deep Bidirectional Transformers for Language Understanding", arXiv, 2019, 16 pages.

Lan et al., "ALBERT: A Lite BERT for Self-supervised Learning of Language Representations", arXiv Sep. 26, 2019, 16 pages.

* cited by examiner

LOGIC TO DECIPHER CONTENT FROM POLICY DOCUMENT

1100

DISPLAYING PARTICULAR SECTION FROM POLICY DOCUMENT

1102 — WHAT IS THE ACCIDENT BENEFIT COVERAGE FOR MY WIFE

§ 1 LEGAL LIABILITY TO OTHERS
§ 2 DRIVING OTHER MOTOR CARS
§ 3 ACCIDENTAL DAMAGE TO THE INSURED VEHICLE
§ 4 LOSS OF OR DAMAGE TO YOUR CAR CAUSED BY FIRE OR THEFT
§ 5 WINDSCREEN AND WINDOW DAMAGE
§ 6 USING YOUR CAR ABROAD
§ 7 NO CLAIM DISCOUNT PROTECTION
§ 8 PERSONAL ACCIDENT BENEFITS
  § 1 SECTION 8 PERSONAL ACCIDENT BENEFITS WE WILL PAY ONE OF TH
  ☑ THE COVERAGE FOR YOUR SPOUSE CAUSE OF DEATH BENEFIT I — 1104
§ 9 PERSONAL BELONGINGS
§ 10 ACCIDENT AND EMERGENCY COVER
§ 11 EMERGENCY OVERNIGHT ACCOMMODATION
§ 12 MOTOR BREAKDOWN ASSISTANCE
§ 13 NO CLAIM DISCOUNT - STEP - BACK
§ 14 NOTES
§ 15 KEYCARE COVER

☐ PROCESS TO FETCH  ② QUESTION  § SECTION AND SUB-SECTION  ☑ ANSWER
CORRECT ANS.

15

SECTION 8
PERSONAL ACCIDENT BENEFITS

WE WILL PAY ONE OF THE FOLLOWING BENEFITS IF YOU OR YOUR SPOUSE SUFFER ACCIDENTAL BODILY INJURY IN DIRECT CONNECTION WITH YOUR CAR AND IF WITHIN 3 MONTHS OF THE ACCIDENT, THE INJURY IS THE SOLE CAUSE OF :

BENEFIT
· DEATH €7000
· TOTAL AND IRRECOVERABLE LOSS OF SIGHT OF BOTH EYES €6000
· TOTAL LOSS OF ONE OR MORE LIMBS WHICH HAVE BEEN SEVERED AT OR ABOVE THE WRIST OR ANKLE €3500
· TOTAL AND IRRECOVERABLE LOSS OF SIGHT OF ONE EYE €3500

— 1106

WE WILL PAY THE BENEFIT, PROVIDED:
(i) THE POLICY IS IN THE NAME OF AN INDIVIDUAL;
(ii) OUR LIABILITY DOES NOT EXCEED €5000 IN TOTAL FOR ALL CLAIMS IN ANY ONE PERIOD OF 12 MONTHS;
(iii) ONLY ONE OF THE ABOVE BENEFITS APPLY FOR EACH PERSON INJURED;
(iv) THE DRIVER OF YOUR CAR WAS NOT UNDER THE INFLUENCE OF DRINK, DRUGS OR SOLVENT ABUSE AT THE TIME OF THE INJURY.

INSTRUCTION TO USER:
ANSWER LIES IN A PAGE PRESENTED IN A PDF POLICY DOCUMENT ABOVE. PLEASE SCROLL UP AND/OR DOWN TO SEE APPROPRIATE SECTION.

AUTOMATICALLY GENERATING NATURAL LANGUAGE RESPONSES TO USERS' QUESTIONS

BACKGROUND

Question answering is a field of computer science that involves not only information retrieval but also natural language processing (NLP). This field is directed towards building systems that automatically answer users' questions without the need for human interference. In order to understand natural language, the computer must be capable of converting the natural language into representations that can be processed by the computer. Furthermore, producing output requires the computers to convert the results of processing the machine representations back into a human-readable format which can be provided as answers to the users' questions. The answers thus produced should include the relevant information responsive to the users' questions in a language that can be understood by humans.

Generally, three types of question answering systems are used. These include information retrieval (IR)-based systems, knowledge-based question answering systems, and systems using multiple information sources. IR-based systems employ keywords from users' queries to identify and output matching text or passages from a set of documents or the Web. IR-based systems may have limited utility because range useful outputs are limited by the number and type of keywords employed in the systems. Knowledge-based systems operate by mapping a query over structured databases. The question, therefore, needs to be provided in a predetermined specific format or may be easily converted into the predetermined, specific format. The need for a predetermined specific format limits the utility of knowledge-based systems. The systems using multiple information sources employ NLP techniques such as parsing, named entity recognition and relationship extraction in order to answer users' questions.

BRIEF DESCRIPTION OF DRAWINGS

Features of the present disclosure are illustrated by way of examples shown in the following figures. In the following figures, like numerals indicate like elements, in which:

FIG. 11 shows an example of an administrative GUI in accordance with the examples disclosed herein.

FIG. 12 shows examples of informational elements in domain-specific documents and data structures produced from the domain-specific documents according to the examples disclosed herein.

DETAILED DESCRIPTION

Figure 1:
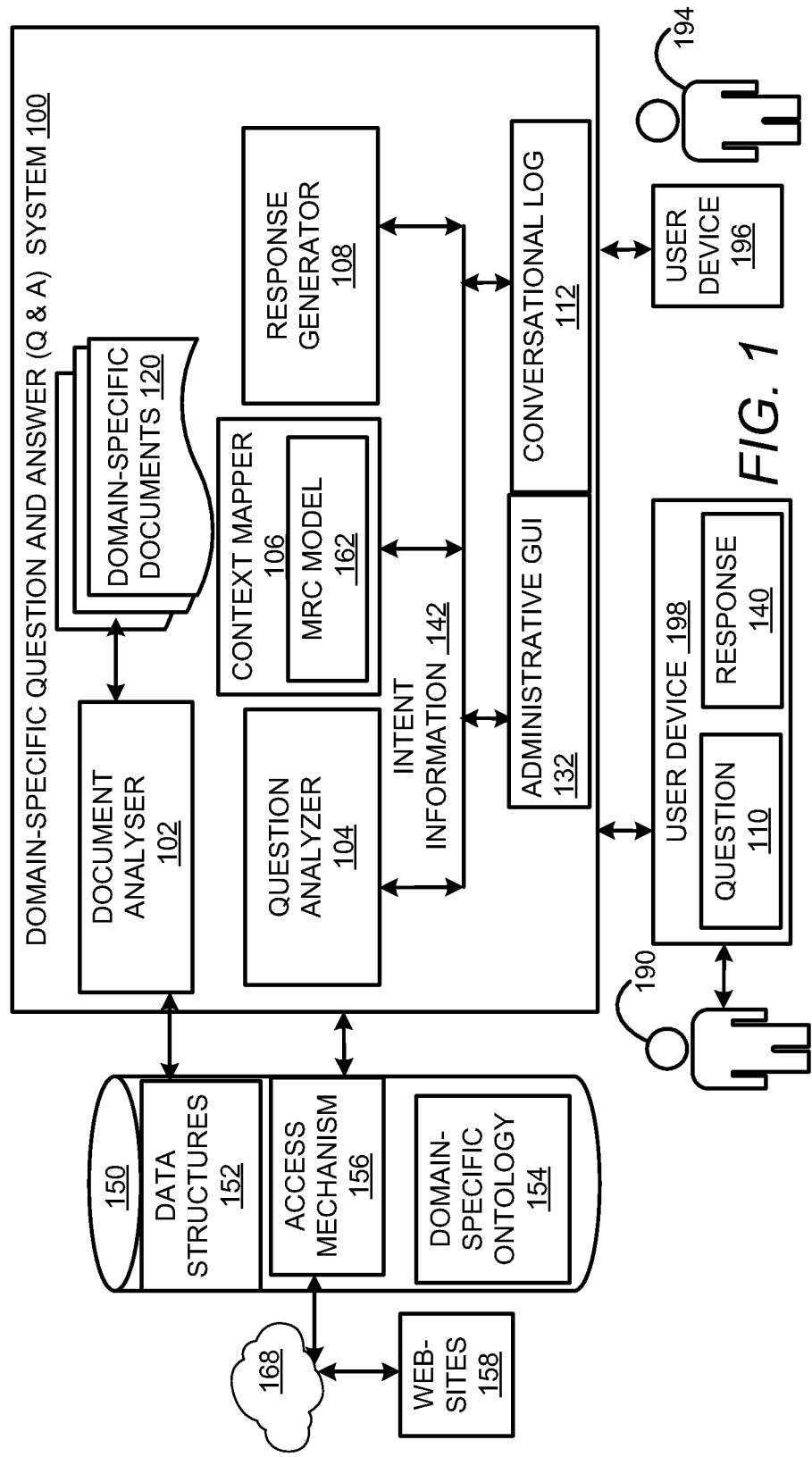
FIG. 1 shows a block diagram of a domain-specific question answering system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A domain-specific automatic question answering system receives a domain-specific question from an end-user, retrieves information from domain-based documents, composes a response that combines terminology from the question and the domain-based documents to provide a natural language-based response. The question answering system builds a knowledge base that includes data structures where each of the data structures maps to a particular domain-specific document. The data structures store information and metadata from the domain-specific documents. The metadata extracted and stored from the domain-specific documents relates to the hierarchy of informational elements within the domain-specific documents such as sections, sub-sections, lists etc. The knowledge base further includes a domain-specific ontology and an access mechanism to external websites in case additional information needs to be retrieved.

In an example, the domain-specific documents are textual documents and are initially processed to extract the text therein. Text extraction tools such as PDFminer, etc., can be used to extract the text. The extracted text is processed to identify the various informational elements from the domain-specific documents. Informational elements include specific arrangements of data so that related information is arranged in a hierarchical manner in specific formats such as sections, sub-sections, lists, etc. The informational elements are identified using relative font sizes, font styles, paragraph indents, and identifiers (e.g., bullets, numberings, or the like), etc. The data structures can include JavaScript object notation (JSON) objects with tags that record the hierarchical elements along with the text therein.

A question that is received from an end-user is analyzed and pre-processed to remove punctuation and white spaces, etc. Features including parts of speech (POS) of the words and key phrases are then extracted from the question. The POS data and the key phrases are used to identify one or more of the data structures that contain information responsive or relevant to the query. The paragraphs from one or more sections/sub-sections and the question are passed to a machine reading comprehension (MRC) model which identifies relevant sentences from the paragraphs. The MRC model is a machine learning (ML) model that is pre-trained on public datasets such as the Wikis for language processing. However, the MRC model is further trained to handle or process domain-specific queries with domain-specific datasets. In an example, the domain-specific data sets can include the archived data of questions or queries that were received in that domain and the answers that were provided from the domain-specific documents. In an example, the domain can pertain to the insurance domain and the training dataset can include the queries raised by the customers (i.e., the end clients) regarding various insurance policies and the responses that were provided to the customer queries. Similarly, the MRC model can be trained to process specific queries in other domains using such domain-specific training datasets. Therefore, a pre-trained ML model is further trained for processing information pertaining to a specific domain. In an example, the MRC model can include a Bi-Directional Attention Flow (BIDAF) model which receives as input a query/the question and a context which can include the paragraph from the one or more sections/sub-sections. A substring that best answers the question is extracted from the context by the BIDAF model as the relevant sentence(s).

The question along with the relevant sentences are provided to a Natural Language Generator (NLG) which can adopt a hybrid approach including sentence planning and surface realization. Sentence planning involves choosing appropriate words to form meaningful phrases and to set a sentence tone. Surface realization components produce an ordered sequence of words as constrained by the lexicon and grammar. The sentence planning phase of response generation involves breaking the received question into subphases, or constituents, to form one or more constituency parse trees. The non-terminals in a constituency parse tree are types of phrases while the terminals may be words in the sentence. Constituency parsing analyzes a sentence in terms of constituents that include a subject (i.e., a noun phrase) and a predicate (i.e., a verb phrase) using decomposition rules. The resulting constituency parse tree can be processed to generate grammatically correct English sentences. For example, SimpleNLG—a library written in Java can perform simple tasks for natural language generation. The question answering system is therefore enabled to specify the subject of a sentence, the verb to be used in the sentence and the object of the sentence along with additional complements. Other manipulations such as verb tenses are also enabled. The response thus generated includes the information from the relevant sentences while employing terms or phrases from the question thereby mimicking human operators while responding to customer queries.

The question answering system also provides for explainable AI so that users who administer the question answering system or other providers associated with the question answering system are able to access and understand the reasoning behind machine-generated responses. In an example, the question answering system can store the received questions and the responses produced for the queries in a log. An administrative user interface associated with the log can display the questions and the answers produced for the questions along with a link for one or more question-answer pairs. The link when selected can display the paragraph or portion of the paragraph with the relevant sentences highlighted.

The question answering system disclosed herein improves natural language processing machines or computers by enabling the machines with cognitive comprehension of textual content in specific domains on which the machines may be trained. Furthermore, it was observed in practice that it is difficult to link a sentence generator to a host system that does not have sentence generation as its primary task. For example, linking sentence generators to systems such as expert systems, databases or domain-specific knowledge bases is difficult as the representations suited to NLG usually differ from the representations used in the systems built for other data storage/retrieval tasks.

Applications exist where the form and content of the responses to be generated are known in advance. In these situations, the NLG component generates mere variations of one or more inputs for producing the outputs. This approach may work for systems with small variations or a limited number of potential input types, it is infeasible for systems with larger datasets that have more variations. When NLG components generate responses for systems with large datasets, they are prone to producing responses that are incoherent and/or incorrect. This problem is further exacerbated in systems that receive questions and produce answers in real-time within the same user session.

The question answering system disclosed herein addresses such technical problems by pairing a NLG-based response generation component with a knowledge base via the MRC model which enables the computer with reading ability. The question answering system thus couples an answer generator or a response generator to a knowledge base thereby enabling a computer to analyze passages and answer questions related to the domain-specific documents with well-framed answers in addition to providing a justification or explanation via the explainable AI interfaces.

FIG. 1 is a block diagram of the domain-specific, automatic question answering system 100 in accordance with the examples disclosed herein wherein the question-answering system 100 is configured to receive questions or queries relating to a specific domain, accesses data associated with the specific domain and provides responses to such domain-specific queries. The question answering system 100 can be trained for various domains including but not limited to, insurance, finance, healthcare, manufacturing, etc. In an example, the question answering system 100 can be configured to handle domain-specific queries in that responses to queries related to a specific organization are handled. The question answering system 100 receives a query or a domain-specific question 110 in a natural language posed by an end-user 190 via one of the input/output (I/O) GUIs, analyzes the question 110 to identify the user intent, and a natural language response 140 is generated with the predicted answer and provided to the end-user 190 via user device 198, Unlike the virtual agents that usually retrieve and provide answers from premade Q & A lists via word matching techniques, the question answering system 100 retrieves information relevant to the question from a knowledge base 150, frames a natural language and grammatically accurate response 140 that includes the retrieved information and provides the response 140 to the user via one of the GUIs. The GUIs can be associated with a virtual agent or a chatbot that receives input from the end-user 190 and provides the output to the end-user 190 via the GUIs that are accessible by a user device 198. Furthermore, question 110 and the response 140 are stored in a conversation log 112 along with paragraphs from domain-specific documents 120, the information from which is included the response 140 to the question 110. If a business user or an administrative user desires to check the accuracy of the question answering system 100, one of the GUIs may be accessed by a corresponding user device 196 which provides the stored question-answer pair along with a link to the portions of the domain-specific documents that were used to respond to the question.

The question answering system 100 includes a document analyzer 102, a question analyzer 104, a context mapper 106, a response generator 108 and the conversational log 112. The document analyzer 102 accesses various domain-specific documents 120 with information that is generally requested by end-users accessing the question answering system 100. In an example, the domain-specific documents 120 can be uploaded by the administrative user 194 for enabling the question answering system 100 to respond to user questions/queries. In the discussion below, examples pertaining to the insurance domain will be discussed to illustrate the various elements of the disclosed subject matter, however, it can be appreciated that the disclosed subject matter need not be confined to the insurance domain and that such elements can be equally applicable to other domains such as finance, healthcare, manufacturing, etc.

In the insurance domain, the domain-specific documents 120 can include policy manuals that outline the details of various policies, customer records, accident reports, claims or other forms, policy quotes, etc. The document analyzer 102 accesses unstructured data from the aforementioned documents, extracts textual subject matter using optical character recognition (OCR) and Natural Language Processing (NLP) if needed and builds data structures 152 for the domain-specific documents 120 in the knowledge base 150. It can be appreciated that unlike simple look-up tools such as tables, lists, or other generic data storage element, the knowledge base 150 is a specialized tool including non-homogenous elements such as the data structures 152, the domain-specific ontology 154 and the access mechanism 156 providing access to the websites 158. The data structures 152 are built in a manner that the informational elements such as sections, sub-sections, lists, etc. within the domain-specific documents 120 are preserved. In addition, the knowledge base 150 includes a domain-specific ontology 154 which includes definitions for technical terms and domain-specific jargon. In addition, the knowledge base 150 can also include a web-based access mechanism 156 that can access external websites 158 using networks 168, such as the internet. For example, in the insurance domain, the websites 158 can include other insurance glossaries with additional domain-specific terminology or Wikipedia pages. If the terms used in the question 110 cannot be found in the domain-specific ontology 154, then the websites 194 can be accessed. In an example, the external websites 194 can be pre-configured within the access mechanism 156 where the access mechanism 156 can include a script with the universal resource locators (URLs) of the external websites 194 hardcoded therein. In the instances where definitions for any of the terms required to answer the question 110 are not included in the domain-specific ontology 154, the external websites 194 can be accessed to retrieve the missing information.

The question analyzer 104 receives the question 110 and analyzes the question 110 to identify the user's intent. Again, the question 110 can be directed to domain-based issues and conveyed in a natural language as it would be conveyed to any human customer representative. Referring to examples in the insurance domain, the questions can pertain, but are not limited, to queries related to policies issued by brokers, help with completing forms/documents, clarification regarding claim coverages and exclusions, reading claims documents and fetching further claim information such as claim number, claim status, etc., and providing answers that are targeted or customized to a given situation. In fact, instead of providing responses verbatim from the domain-specific documents 120 which may be in standard domain-specific jargon (e.g., as used by insurance agents or adjusters), the response 140 includes information from the domain-specific documents 120 that is further customized to the question 110 in order to provide a precise well-formed answer that is generated using terminology employed by the end-user 190 (e.g., in layman's terms) in the question 110. In an example, the question answering system 100 can be text-based wherein the end-users can key in the questions and the responses are provided on a text-based UI. In an example the question answering system 100 can be configured with voice application program interfaces (APIs) so that the end-users can use speech to convey the questions and answers may be provided audibly and/or on GUI.

Upon analyzing and identifying the intent of the question 110, the intent information 142 can be conveyed to the context mapper 106. In an example, the intent information 142 can include specific words or key phrases that convey the intent. The intent information 142 is employed by the context mapper 106 to map to the relevant sections and sub-sections of the relevant sections within the domain-specific documents 120. The intent information 142 can be used to conduct a word search of the data structures 152 using the key phrases and the corresponding sections/sub-sections are retrieved. In an example, one or more paragraphs that include sentences matching the words are retrieved by the context mapper 106 from the sub-sections of the relevant section. In order to identify the sentences including the answer, the context mapper 106 includes a pre-trained machine learning (ML) model or an MRC model 162 which has been further trained on domain-specific data sets.

The sentences including the information requested by the end-user 190 are transmitted to the response generator 108 along with the question 110. The response generator 108 frames a well-structured natural language-based response 140 which includes the information from the domain-specific documents but with terms that were used in the question 110. In an example, the response generator 108 includes a natural language generator (NLG) which employs a set of rules e.g., rules of grammar, to frame the information extracted from the domain-specific documents 120 into well-formed, grammatically accurate sentences using the same terms as those employed by the end-user 190. The response 140 thus produced is provided to the end-user 190 via one of the GUIs. The response generator 108 is rule-based and needs no training. However, the output from the response generator 108 can be used to train other ML systems.

In addition, the response 140 along with the question 110 may be stored in the conversational log 112 which enables an administrative user 194 to determine the accuracy of the performance of the question answering system 100. The administrative user 194 can be provided with an administrative GUI 132 coupled to the conversational log 112. The administrative GUI 132 when accessed, displays the question 110 and the response 140 along with a link, which when selected, can run a script to retrieve the paragraph which included the answer. The specific sentences having information relevant to the question 110 and used to generate the response 140 may be highlighted and displayed by the administrative GUI 132 which may be accessed by employing a user device 196. The MRC model 162 is therefore validated.

Figure 2:
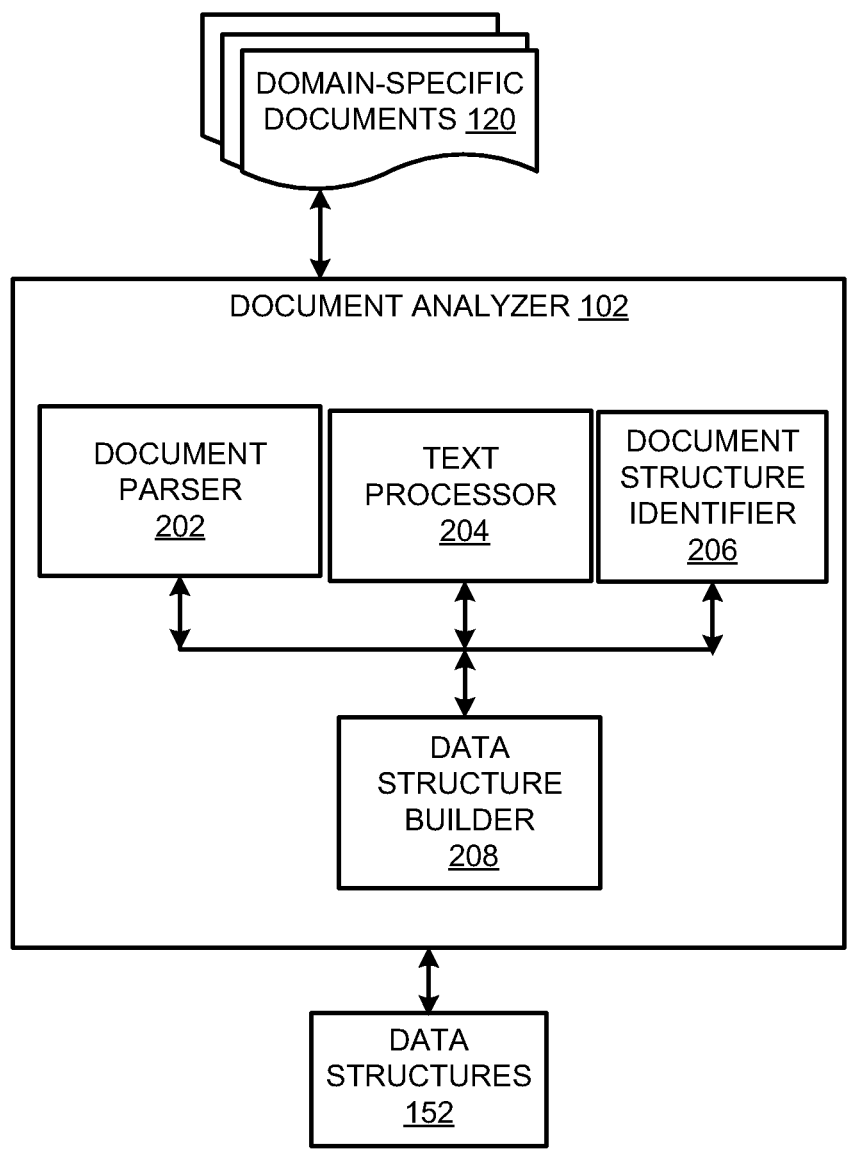
FIG. 2 shows a block diagram of a document analyzer in accordance with the examples disclosed herein.

FIG. 2 shows a block diagram of the document analyzer 102 in accordance with the examples disclosed herein. The document analyzer 102 includes a document parser 202, a text processor 204, a document structure identifier 206, and a data structure builder 208. The document parser 202 extracts text from the domain-specific documents 120. Tools such as but not limited to Pdfminer, which is a Python package, or program code can be used for text extraction. The document parser 202 can extract the texts that are rendered programmatically, i.e., the text is not part of a scanned image. The document parser 202 can also extract the corresponding locations, font names, font sizes, writing direction (horizontal or vertical) for each text segment. The free text thus extracted is pre-processed by the text processor 204 to remove white spaces, stop words, punctuation, etc. The extracted text is thus cleaned in order to gather sentences that carry the necessary information. The document structure identifier 206 identifies the informational element of each of the domain-specific documents 120. The informational elements include the various ways in which data or information is arranged within the domain-specific documents 120 such as but not limited to, sections, sub-sections, lists, etc. The document structure identifier 206 can employ tools such as relative font sizes, font styles, text indents, bullets or numberings for lists, etc., for the identification of the various informational texts. For example, headings and sub-headings corresponding to the sections and sub-sections may have bigger font sizes as compared to text in the body of a section or subsection. Similarly, the font of the headings and sub-headings may be bolded or italicized or underlined or all the three effects can be applied. Thus, using font styles and sizes, sections and sub-sections can be identified.

Furthermore, information analysis techniques such as topic modeling or semantic similarity can be used to identify the sections/sub-sections based on the titles and/or sub-titles associated with the various informational elements, Topic modeling is different from rule-based text mining approaches that use regular expressions or dictionary-based keyword searches. Instead, topic modeling employs use of probabilistic topic models that refer to statistical algorithms for discovering latent semantic structures in a body of the text. In an example, Latent Dirichlet Allocation (LDA) can be used as a topic model to classify text in a document/section/sub-section to a particular topic. LDA can build a topic per document model, words per topic model, modeled as Dirichlet distributions. Additionally, resources such as the domain-specific ontology 154 or the websites 158 can also be employed for identifying the sections, the sub-sections and related paragraphs. In addition, the POS metadata of each of the sentences is also extracted.

For each of the domain-specific documents 120 the data structure builder 208 builds a corresponding data structure that not only includes the information from the document including the POS metadata but also preserves the hierarchical arrangement of the data within the document. In an example, the data structure builder 208 can transform the domain-specific documents 120 into the data structures 152 such as JSON structures that use JavaScript notation for encoding the various informational elements in the same hierarchical order in which they are arranged within the domain-specific documents 120. The data structures 152 are used to extract information necessary to frame responses to the users' questions.

Figure 3:
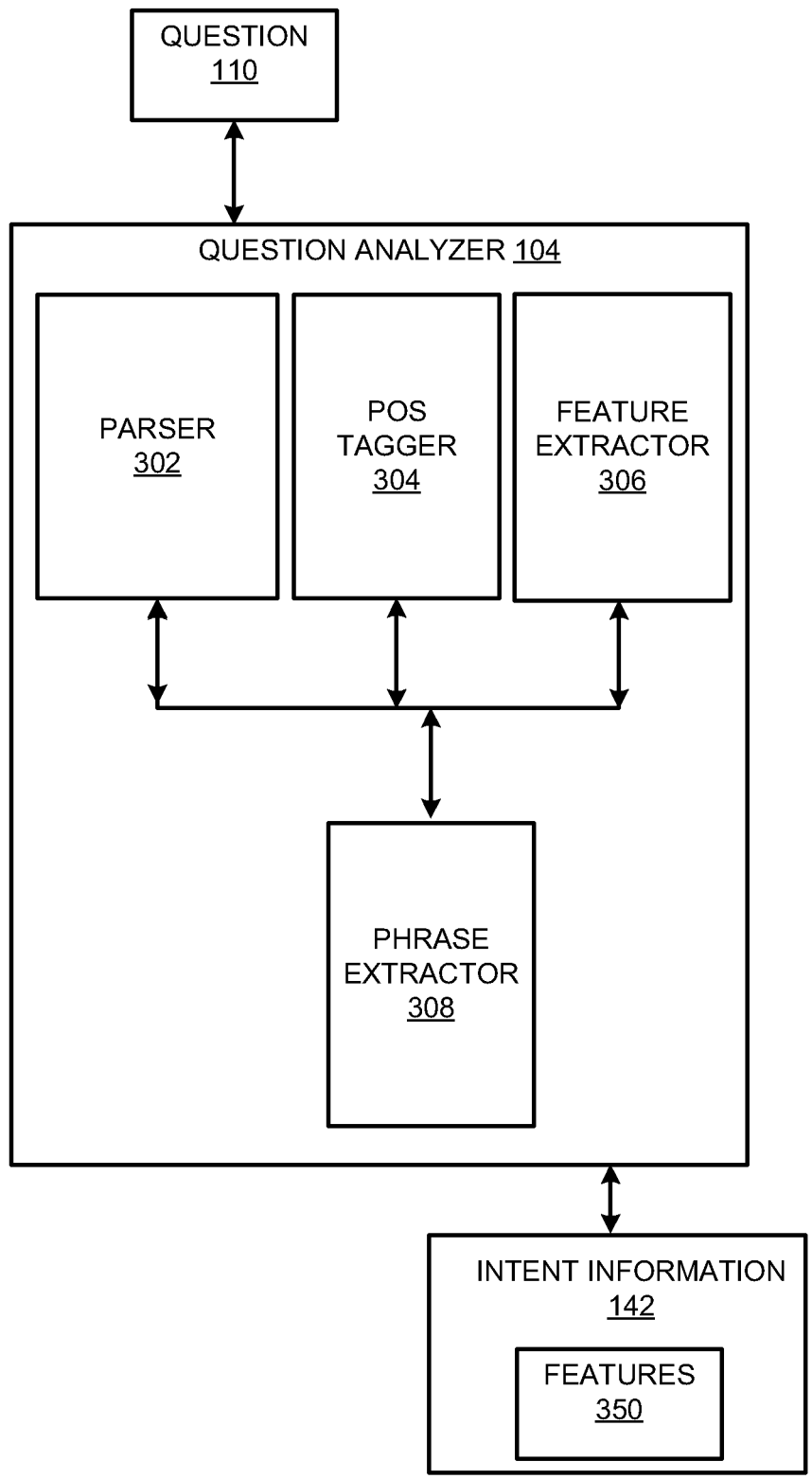
FIG. 3 shows a block diagram of a question analyzer in accordance with the examples disclosed herein.

FIG. 3 shows a block diagram of the question analyzer 104 in accordance with the examples disclosed herein. The question analyzer 104 includes a parser 302, a POS tagger 304, a feature extractor 306 and a phrase extractor 308. The parser 302 tokenizes and parses the question 110 input by the end-user 190. The POS tagger 304 includes the POS information for each of the tokens produced by the parser 302. The feature extractor 306 identifies the corresponding POS metadata of the various words as features 350. In an example, named entity recognition (NER) techniques based on domain-specific terminology or jargon can also be employed to identify the POS metadata of the words in the question 110. Thus, verbs, nouns, adjectives, adverbs, noun conjunctions, verb conjunctions, etc. are extracted as features. Furthermore, the phrase extractor 308 which can employ a natural language tool kit (NLTK) can be used to extract key phrases from the question. NLTK is one of the many open-source natural language processing (NLP) libraries that are available for executing tasks such as tokenizing, POS tagging, sentiment analysis, stemming, topic segmentation and named entity recognition (NER). NLTK, therefore, enables a computing device to preprocess and understand written text. The analysis of the question 110 by the question analyzer 104 enables producing the intent information 142 which includes not only the features 350 but also particular words, entities, etc., but also certain domain-specific phrases that can enable the context mapper 106 in identifying the relevant sections and sub-sections.

Figure 4:
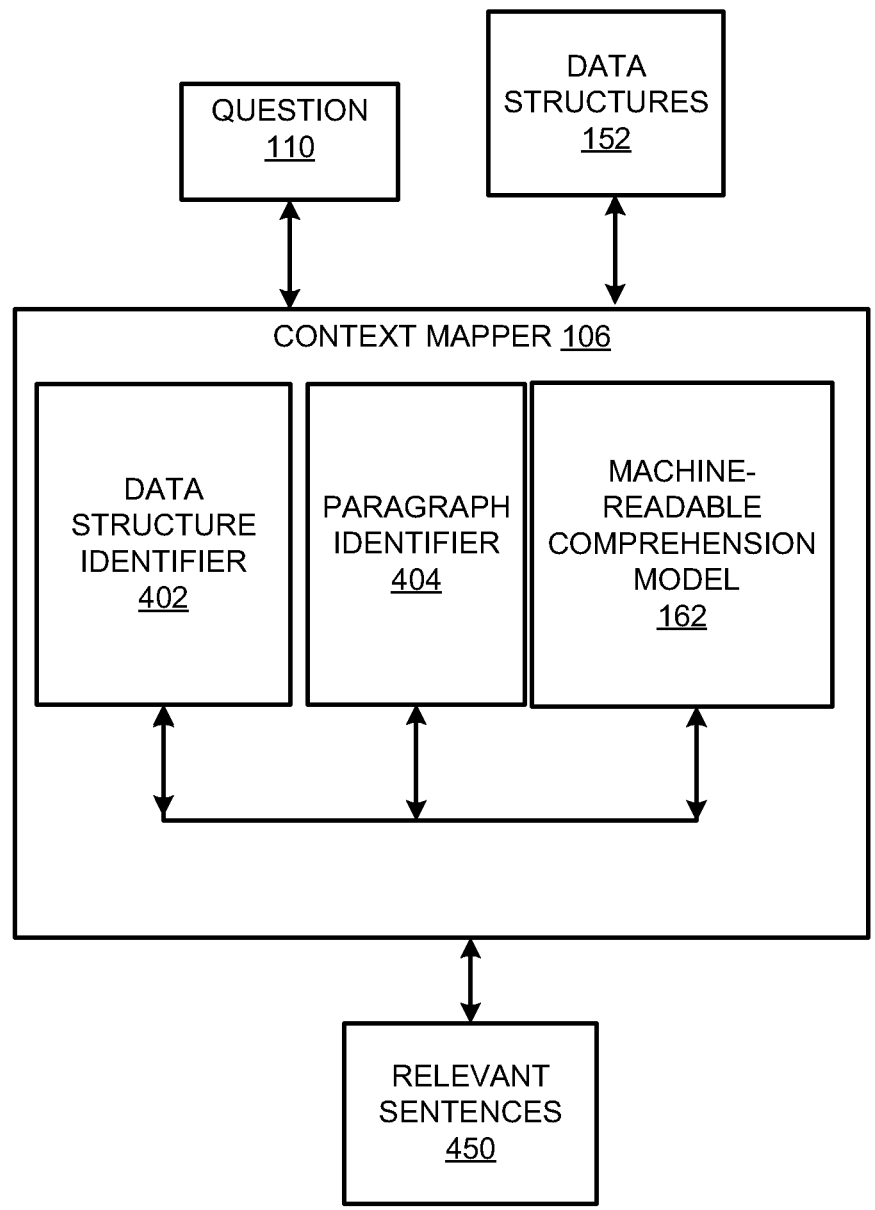
FIG. 4 shows a block diagram of a context mapper in accordance with the examples disclosed herein.

FIG. 4 shows a block diagram of the context mapper 106 in accordance with the examples disclosed herein. The context mapper 106 includes a data structure identifier 402, a paragraph identifier 404 and the MRC model 162. Based on the intent information 142 from the question analyzer 104, the context mapper 106 identifies the sentences within the domain-specific documents 120 including the information responsive to the question 110. The data structure identifier 402 identifies one or more of the data structures 152 that include information relevant to the question 110 using techniques such as topic modeling. More particularly, topic modeling can be used to identify the relevant sections and one or more sub-sections of the relevant sections. Furthermore, the data structure identifier 402 can employ semantic similarity to identify the sections and sub-sections that are relevant to the question 110.

Upon identification of the relevant sections/sub-sections, the paragraph identifier 404 further employs word/text matching in addition to semantic similarity techniques for determining the paragraphs that contain information pertinent to the question 110. In an example, the key phrases from the question analyzer 104 can be matched to the topics identified from the domain-specific documents 120. The domain-specific documents 120 represented by the data structures 152 can be transformed into term-frequency-inverse document frequency (TF-IAF) vectors. The cosine similarity between the TF-IDF vectors and the key phrases can be computed to identify the semantically similar paragraphs from the data structures 152 that match the words and/or the key phrases of the question 110. More particularly, one or more paragraphs determined to contain an answer to the question, along with the question 110 are passed to the MRC model 162.

In an example, the MRC model 162 can include a BIDAF model. The BIDAF model is a closed-domain, extractive NLP model. Hence, the BIDAF model requires an accompanying text (termed as a 'context') along with the question to extract an answer to the question from the accompanying text, i.e., the Context. When used as the MRC model 162, the BIDAF model takes in the question 110 and the paragraph identified by the paragraph identifier 404 as inputs. BIDAF model extracts a substring from the Context that best answers the question. In the example being discussed, the MRC model 162. It may be noted that the BIDAF model extracts the answer including relevant sentences 450 that can form an answer to the question 110 verbatim from the accompanying paragraph. Generally, such sentences are framed in a typical linguistic style characteristic of the policy documents or other domain-specific technical literature. In order to improve user experience with the question answering system 100, the answer extracted from the domain-specific documents 120 needs to be re-phrased in a manner that echoes the question 110 in order that the question answering system 100 may mimic the human behavior.

Figure 5:
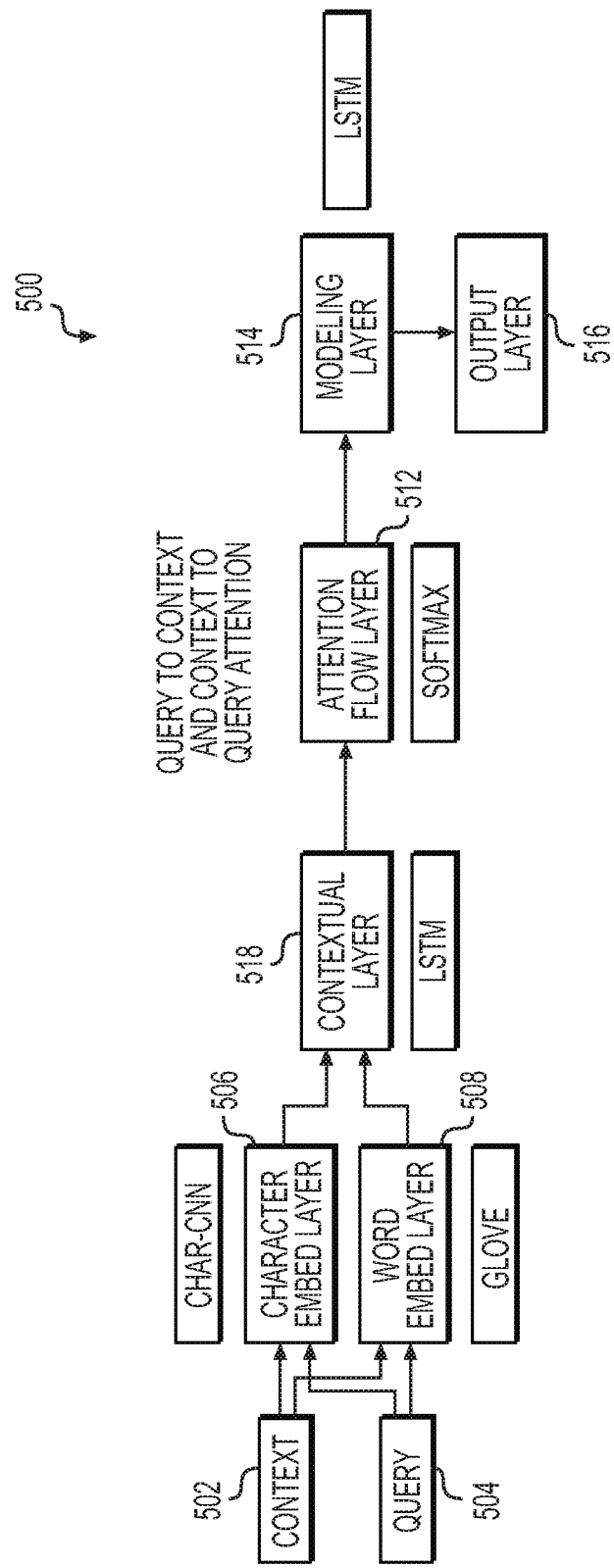
FIG. 5 shows a block diagram of a Bi-Directional Attention Flow (BIDAF) model in accordance with an example disclosed herein.

FIG. 5 shows a block diagram of the BIDAF model 500 in accordance with an example disclosed herein. As mentioned above, the BIDAF model 500 receives the context 502 and the query 504 in order to predict the answer or the sentences within the context 502 that include information relevant to the query 504. In an example, the BIDAF model 500 can be trained on millions of records drawn from public sources such as, Wikipedia articles and is therefore trained to identify the types of question that can be framed within the English language like 'what', 'when', 'where', etc. In addition, the BIDAF model 500 can also be trained on domain-specific training data that can include the questions and the corresponding accurate answers to the questions. Referring to the insurance domain as an example, the BIDAF model 500 can be trained on insurance-related queries that are put by customers and the corresponding insurance policy documents and passages that contain information responsive to insurance-based queries wherein the relevant lines from the passages are highlighted for the training.

BIDAF 500 exhibits a modular architecture that is formed of standard NLP elements such as Global Vector (GloVe), convolutional neural networks (CNN), Long Short-Term Memory (LSTM) and Attention. The layered structure enables BiDAF to identify the location of an answer to the query 504 within the context 502. The embedding layers including the char-CNN forming the character embed layer 506. The Word embed layer 508 transforms the words in the query and context from strings to vectors of numbers. GloVe is an example word embedding algorithm that enables the conversion from the strings to the vectors. GloVe is an unsupervised learning algorithm that uses co-occurrence frequencies of words in a corpus to generate the words' vector representations. These vector representations numerically represent various aspects of the words' meaning.

The query 504 and context 502 representations thus generated are provided to the attention flow layer 512 and modeling layer 514 that use matrix operations to fuse the information contained in the query 504 and in the context 502. The contextual layer 518 maps the vector values of the query 504 with those of the context 502 to compare sequences within the query 504 and the context 502 using a similarity function. The similarity function provides a scalar output referred to as an "attention score" based on similarities obtained between words of the question 110 and each of the relevant sentences 450. In an example, the attention flow layer 512 can include a Softmax function while the modeling layer 514 can include an LSTM. The attention flow layer 512 applies Softmax to the attention scores to generate a probability distribution called the "attention distribution". An "attention output" is therefore obtained mathematically from the attention scores. The output of the attention flow layer 512 and the modeling layer 514 is another representation of the context 502 that contains information relevant to the query 504. The context representation relevant to the query 504 is provided to the output layer 516 which transforms the context representation relevant to the query 504 into a collection of probability values that can be used to determine the beginning and the ending locations of the relevant sentences within the context or paragraph.

Figure 6:
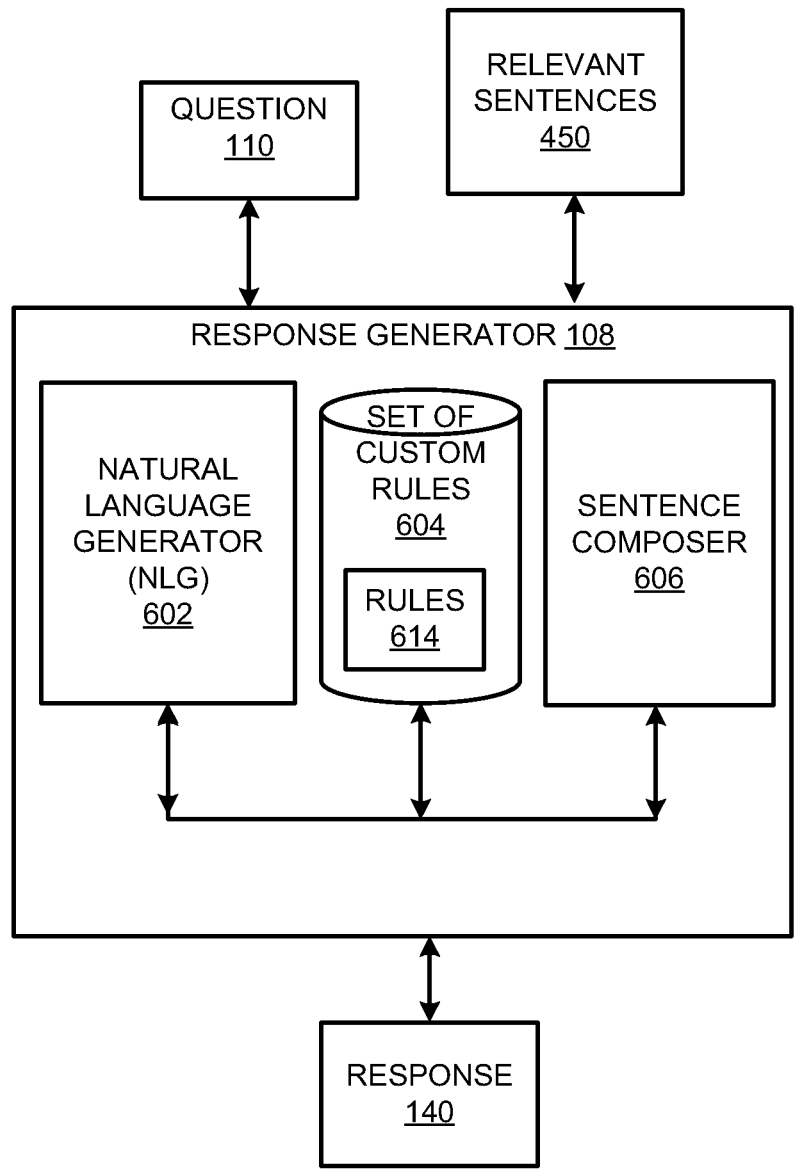
FIG. 6 shows a block diagram of a response generator in accordance with the examples disclosed herein.

FIG. 6 shows a block diagram of the response generator 108 in accordance with the examples disclosed herein. The response generator 108 includes a natural language generator (NLG) 602, a set of custom rules 604 and a sentence composer 606. The NLG 602 accesses the question 110 and the relevant sentences 450 to identify language structures such as subject, object, and predicate from the question and the relevant sentences 450. In an example, the question 110 may only include a single sentence. In an example, the question 110 can include multiple sentences wherein the first few sentences describe a scenario while the last sentence can pertain to a question. The NLG 602 can analyze the plurality of sentences that form the question 110 for identifying the subjects, objects and predicates. Similarly, the subjects, objects and predicates can be identified from the relevant sentences 450 provided by the context mapper 106. In an example, the NLG 602 can include a trained classifier that can sort parsed tokens obtained from the question 110 and the relevant sentences 450 into one of the multiple subject, object and predicate classes.

The subjects, objects and predicates obtained from the NLG 602 can be further analyzed by application of semantic similarity techniques to identify synonyms between the question 110 and the relevant sentences 450 so that different words with the same meaning can be grouped. The groups of subjects, objects and predicates can be used together for identifying one or more rules 614 from the set of custom rules 604. The sentence composer 606 uses the information from the relevant sentences 450, uses the subject(s), object(s) and predicate(s) retrieved from the question 110 (which may or may not include a scenario) and composes the response 140 using the terms from the question 110 or the relevant sentences as appropriate based on the one or more rules 614. In some instances where the information from the relevant sentences is inadequate, information can also be retrieved from one or more of the domain-specific ontology 154 and/or external websites 158 may also be used to compose the response 140. The question answering system 100 is, therefore, configured to compose a human-like answer using terms from the question 110 in combination with the information retrieved from the various sources. In an example, the response generator 108 can include packages such as Stanford CoreNLP for generating the responses.

Figure 7:
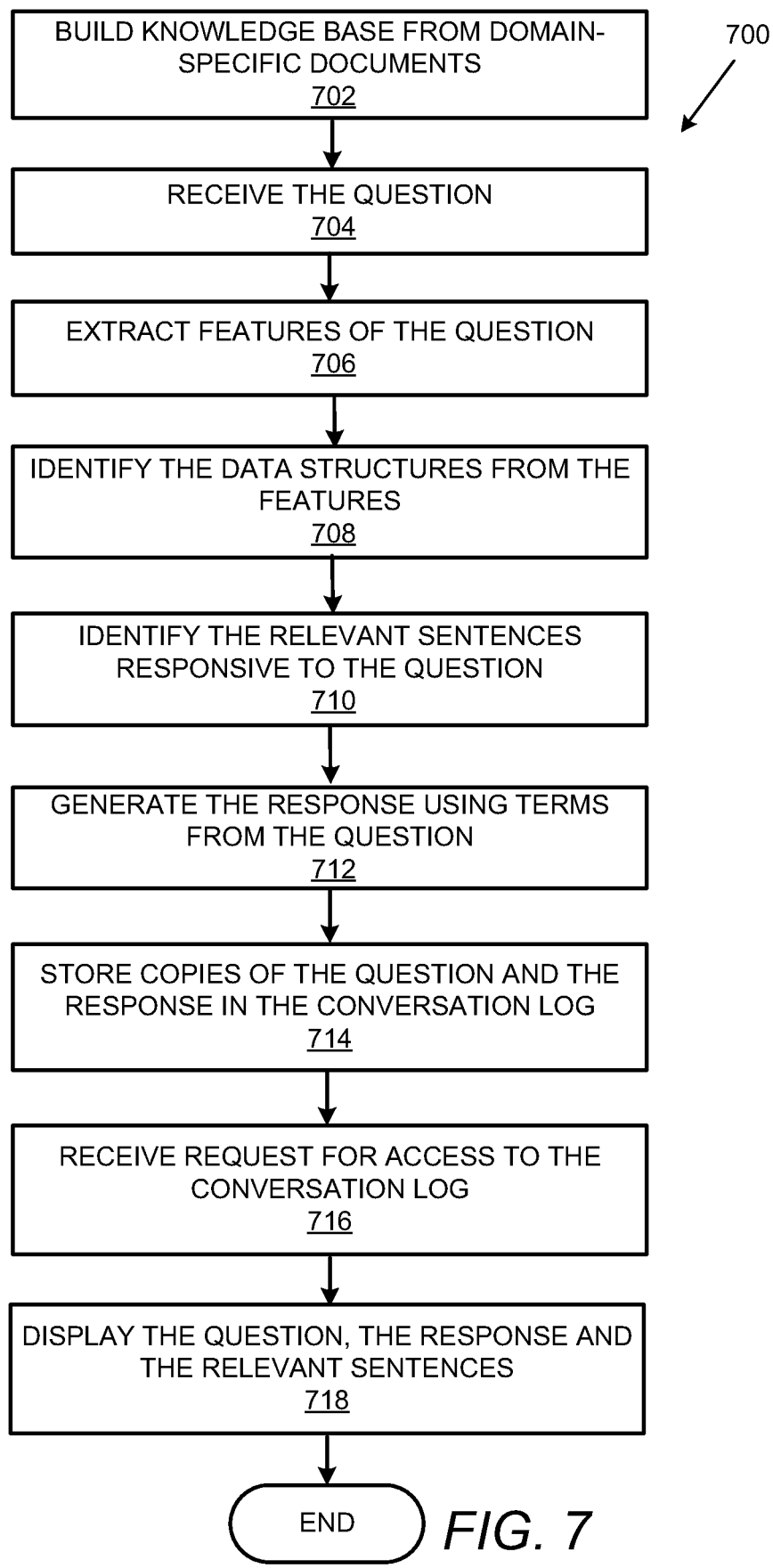
FIG. 7 shows a flowchart that details a method of providing responses to domain-specific questions received from the users in accordance with the examples disclosed herein.

FIG. 7 shows a flowchart 700 that details a method of providing responses to domain-specific questions. For example, domain specific questions can be received from the users in complete sentences using terms from the question in accordance with the examples disclosed herein. The method begins at 702 wherein the knowledge base 150 is built from the domain-specific documents 120. In an example, the administrative user 194 can scan in or otherwise provide the domain-specific documents 120 to the document analyzer 102 for the creation of the knowledge base 150 which can include building the data structures 152 that preserve hierarchies of the informational elements in domain-specific documents containing information for responding to users' questions. The informational elements, in accordance with some examples, can include, the sections and the sub-sections of the domain-specific documents 120. With the building of the data structures 152 are built, the question answering system 100 is ready to process users' questions and provide appropriate responses in natural language that mimic responses from human operators.

At 704, the question 110 is received in textual format. The features of the question 110 including the parts of speech of the words in the question 110 along with the key phrases are extracted at 706. At 708, the intent information 142 including the parts of speech and the key phrases can be used to identify the data structures 152 that include information relevant to the question 110. Accordingly, the sections and/or sub-sections from the domain-specific documents 120 and the corresponding paragraphs that include information relevant to the question 110 are identified at 708 using the various parts of speech obtained from the question 110 and by applying topic modeling and semantic similarity techniques for identifying the relevant sections and sub-sections. At 710, the relevant sentences 450 that include the information responsive to the question 110 are identified by the MRC model 162. The MRC model 162 receives as input, the question 110 and the context or the paragraphs including the relevant information to identify the relevant sentences 450. The response 140 is generated at 712 can use the terms from the question 110 and including the information from the relevant sentences 450. The response 140 is provided to the end-user 190 in via a user interface which may include the same GUI from which the question 110 was received. At 714, a copy of the question 110 and the response 140 are stored along with links to the relevant sentences 450. When a request for access to the relevant sentences 450 is received from the administrative user 194 at 716, the script to the relevant sentences 450 can be executed and the question 110, the response 140 along with the paragraph including the relevant sentences 450 can be displayed to the administrative user 194 at 718 with the relevant sentences 450 highlighted.

Figure 8:
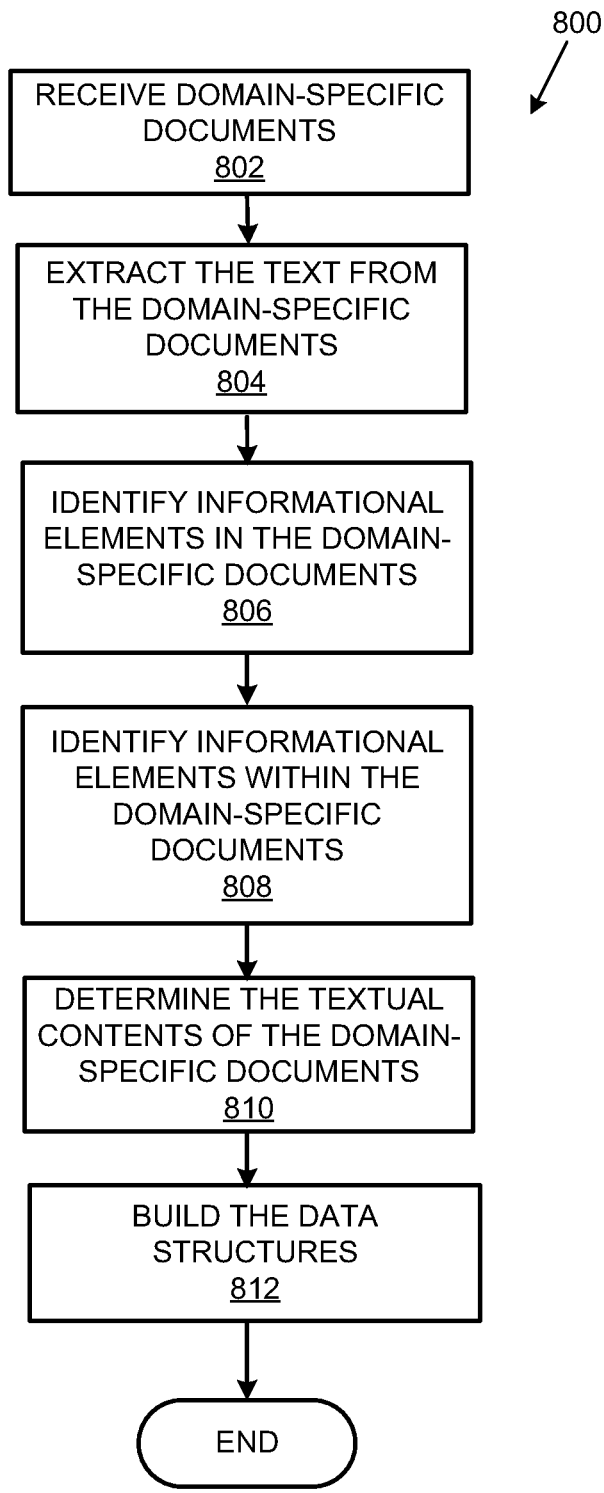
FIG. 8 shows a flowchart for building a domain-specific knowledge base in accordance with the examples disclosed herein.

FIG. 8 shows a flowchart 800 for building the domain-specific knowledge base 150 in accordance with the examples disclosed herein. The domain-specific documents 120 are received at 802 from various modes, such as but not limited to, via email from the administrative user 194, accessed from a database, etc. If the domain-specific documents 120 are not in a machine-readable format, then such domain-specific documents can be converted into machine-readable format via techniques such as word embeddings, vectorization, etc. At 804, the text is extracted from the domain-specific documents 120 using tools such as but not limited to Pdfminer which is a Python package or program code. The extracted text is processed at 806 to identify various informational elements or elements such as the sections, sub-sections, lists, etc. At 808, different processes such as but not limited to, determining relative font sizes, identifying idents before paragraphs or sentences, lists including numbered lists or bulleted lists, can be used to identify the informational elements within the domain-specific documents. At 810, NLP techniques such as one or more of topic modeling and semantic similarity can be employed to determine the textual contents of the sections, the sub-sections and other informational elements in the domain-specific documents. The data structures 152 are built at 812 in a manner that not only is the information but also the hierarchal order of the informational elements is stored therewithin. In an example, the data structures 152 can include JSON objects.

Figure 9A:
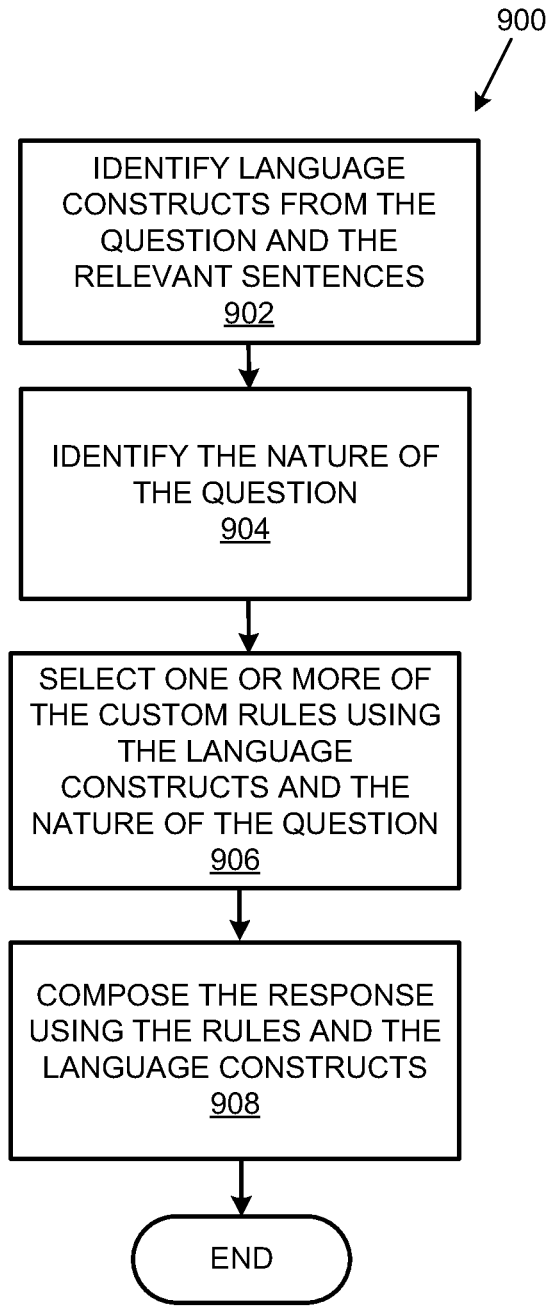
FIG. 9A shows a flowchart that details a method of generating a response including information from relevant sentences in accordance with the examples disclosed herein.

FIG. 9A shows a flowchart 900 that details a method of generating the response 140 including the information from the relevant sentences 450 in accordance with the examples disclosed herein. At 902, various language constructs such as the subjects, objects and predicates are initially identified from the question 110 and the relevant sentences 450. At 904, the nature of the question 110 is identified, using, for example, word matching techniques. The nature of the question 110 can include the type of information that the question 110 requests such as but not limited to, which, why, what or how, etc. Furthermore, a semantic understanding of the question 110 can be obtained by processing the question 110 and the relevant sentences 450 using semantic similarity techniques. Based on the nature of the question 110 and the subjects, objects and predicates processed further with topic modeling and semantic similarity the one or more rules 614 for framing an answer are selected at 906. The response 140 is composed at 908 using the rules of grammar and the language constructs such as the subjects, objects and predicates identified from the question 110 and the relevant sentences 450. In an example, wherein synonymous words selected from the question 110 versus the relevant sentences 450, the rules 614 enable selection of the words from the question 110 for use in composing a more human-like response as opposed to just citing relevant information verbatim from the domain-specific documents 120.

In an example, a tree structure of the relevant sentences 450 containing the answer is generated by the sentence composer 606 employing the one or more rules 614. The tree structure arranges the subject(s), object(s) and a predicate(s) from the sentences in a hierarchical format, substitutes terms from the sentences in the tree structure with semantically similar terms from the question and generates the response via the arrangement wherein one or more of the subject, the object and the predicate include the semantically similar terms from the question.

Figure 9B:
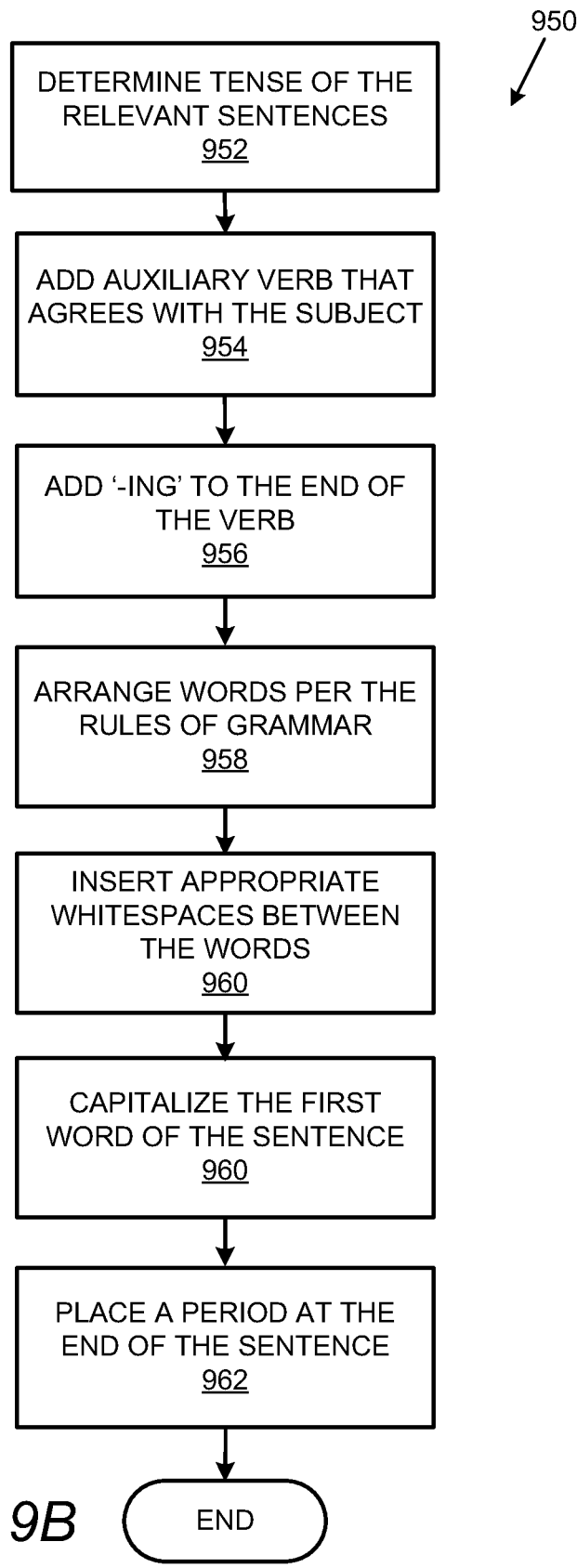
FIG. 9B shows a flowchart that details of a method of composing a complete response using the rules of grammar in accordance with the examples disclosed herein.

FIG. 9B shows a flowchart 950 that details of a method of composing the response using the rules of grammar in accordance with an example. It can be appreciated that this method is detailed only for illustration purposes and that other methods can be implemented with different grammatical rules or structures in accordance with some examples. At 952, a tense of the relevant sentences 450 is determined. If a past tense/participle form of a verb is an ancestor of all other verbs in the verb phrase, the tense of a sentence can be marked as past tense. In an example, Stanford NLP provides a parser that can be used to detect the outermost verb phrase. At 954, an auxiliary verb such as 'was' can be added in a manner that the verb agrees with the subject. More particularly, the singular or plural form of the verb or the number associated with the verb matches the singular or plural form of the subject. Therefore, a singular subjects are combined with the singular forms of the auxiliary verbs while plural subjects are combined with the plural forms of the auxiliary verbs. At 956, an '-ing' is added to the end of the verb (other than the auxiliary verb) as the progressive aspect of the verb is preferred. The words thus gathered are arranged per the rules of grammar at 958. In an example, the words can be arranged in a canonical word order in English which includes subject-verb-object. At 960, the appropriate whitespaces are inserted between the words of a sentence. Individual tokens which include words of the relevant sentences 450 and any terminology taken from the question 110 can be identified and arranged with whitespaces in between. At 962, the first letter of the sentence is identified and capitalized while a period is placed at the end of the sentence at 964 to form the response 140.

Figure 10A:
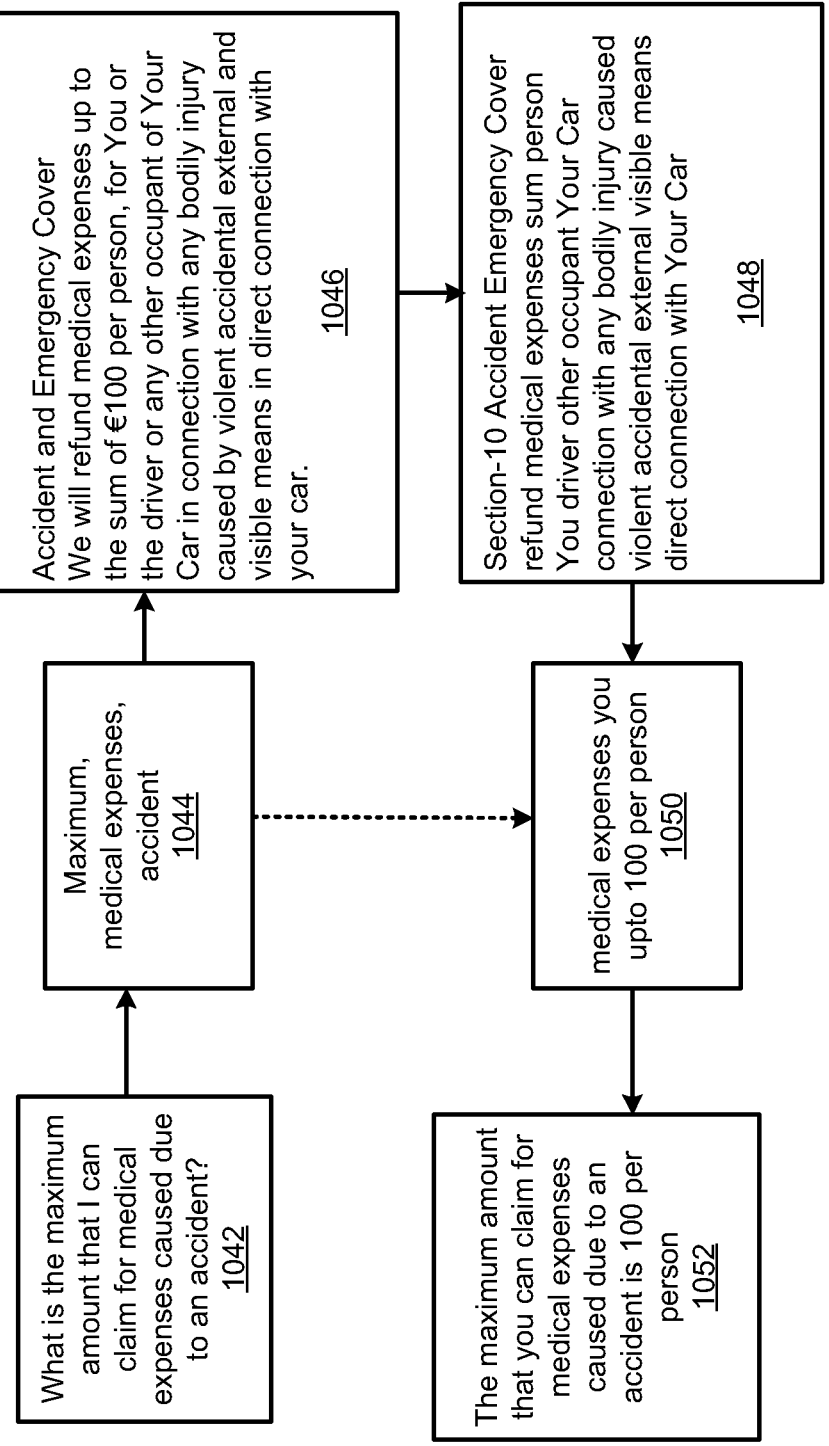
FIGS. 10A, 10B, 10C and 10D show some sample questions and responses provided to the questions in accordance with the examples disclosed herein.

FIG. 10A shows an example of the generation of a response to a received question. A user query 1042 is received and processed by the question analyzer 104 for POS tagging and the different nouns, adverbs, adjectives and verbs are extracted to obtain certain keywords 1044. The keywords 1044 can be used to identify a policy document or one of the data structures 142 that corresponds to the relevant section 1046. Again, upon pre-processing and POS tagging, section keywords including the nouns, adverbs, adjectives and verbs are extracted from the relevant section 1046 which can be further used to extract features 1048 using feature extraction techniques such as topic modeling using Latent Semantic Indexing (LSI) Bi-grams, etc. When the extracted features input to the MRC model 162 along with the relevant context, the MRC model 162 provides an output 1050. The output 1050 when combined with the keywords 1044 and using the NLG techniques applied by the response generator 108 can produce a final, well-formed, grammatically accurate response 1052.

Figure 10B:
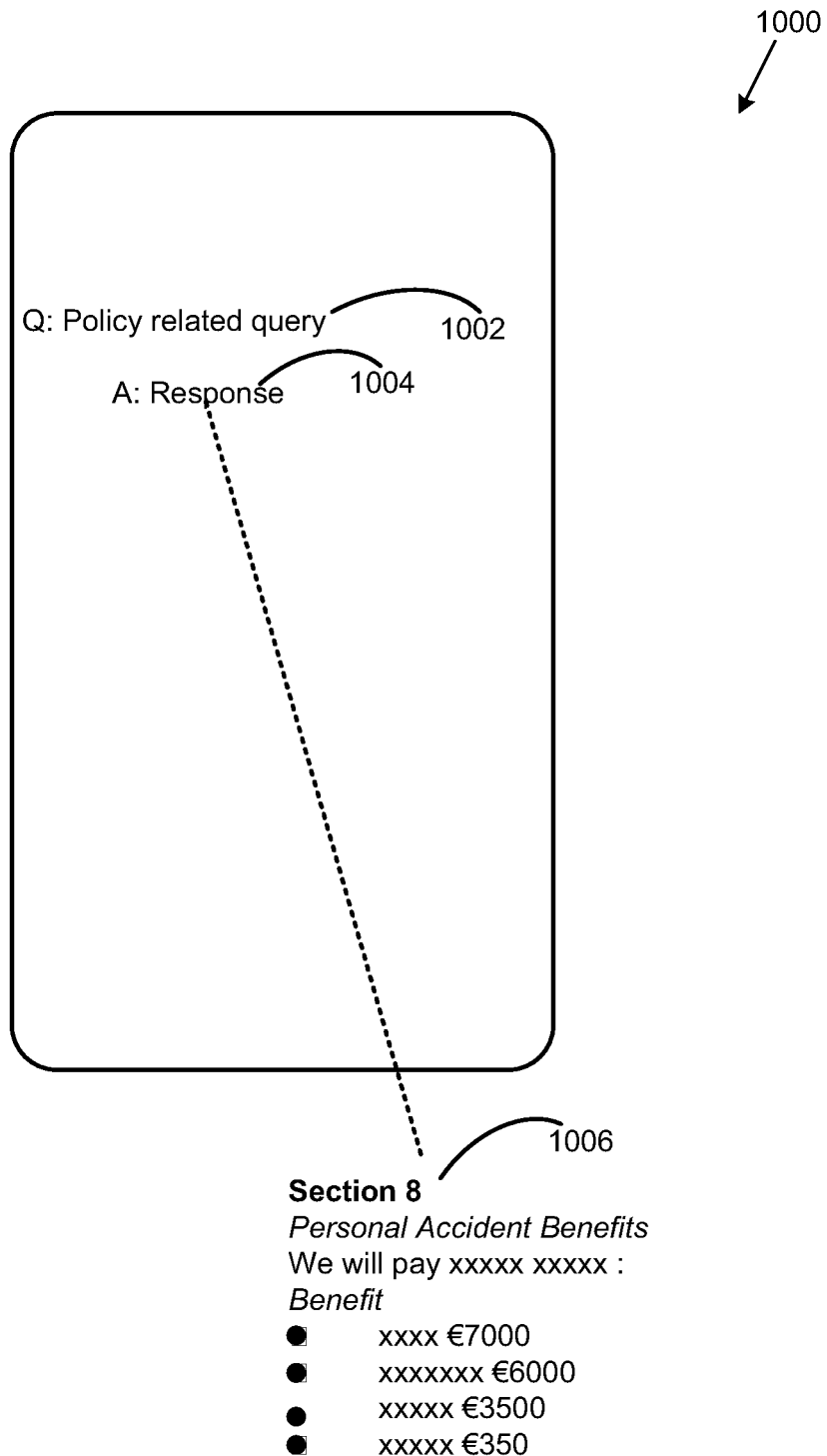

FIG. 10B shows a GUI 1000 that receives questions and provides responses to the questions in accordance with an example disclosed herein. The GUI 1000 receives a personal accident policy-related query 1002 from the end-user 190 and provides a response 1004 with the information 1006 drawn from one of the data structures 152 generated from a corresponding one of the policy documents. For example, the policy-related query can enquire, "What is the accident benefit coverage for my wife?" The query 1002 is initially analyzed to gain an understanding of the query context. More particularly, the nouns, verbs, adverbs, adjectives and phrases connected to the query context are identified by the question analyzer 104. Parts of speech including nouns like 'accident' and 'my wife' and key phrases such as 'benefit coverage' are identified. Topic modeling and semantic similarity techniques are adopted by the context mapper 106 for identifying the sections and sub-sections with the relevant info oration from the data structures 152. As seen at 1006, Section 8—Personal Accident Benefits is identified as the relevant section using, for example, topic modeling to identify 'Personal Accident Benefits' as relevant to 'accident' mentioned in the query 1002. The section 8 shown at 1006 not only retains the information from the policy documents but also retains the section and sub-section structural format. For example, Section 8 labeled as "Personal Accident Benefits" can recite that, "We will pay one of the following benefits if You or Your Spouse suffer accidental bodily injury in direct connection with Your Car and if within 3 months of the accident, the injury is the sole cause of:

Benefit
Death €7000
Total and irrecoverable loss of sight of both eyes €6000
Total loss of one or more limbs which have been severed at or above the wrist or ankle €3500
Total and irrecoverable loss of sight of one eye €350."

Semantic understanding and similarity are used to identify as personal and 'spouse' as synonymous with 'wife'. The nouns and noun phrases are therefore mapped to the sections and sub-sections. The MRC model 162 which is further trained on the insurance corpus can identify and fetch the particular sentences from the paragraph that have the requested information. The response generator 108 uses the information from the sub-sections and composes the response 1004 in grammatically accurate English. In an example, the response thus generated is output to the same GUI 1000 that received the query 1002. The response 1004 may read as, "The coverage of your spouse cause of death benefit is €7000 • total and irrecoverable loss of sight of both eyes €6000 • total loss of one or more limbs which have been severed at or above the wrist or ankle €3500 • total and irrecoverable loss of sight of one eye €3500".

Figure 10C:
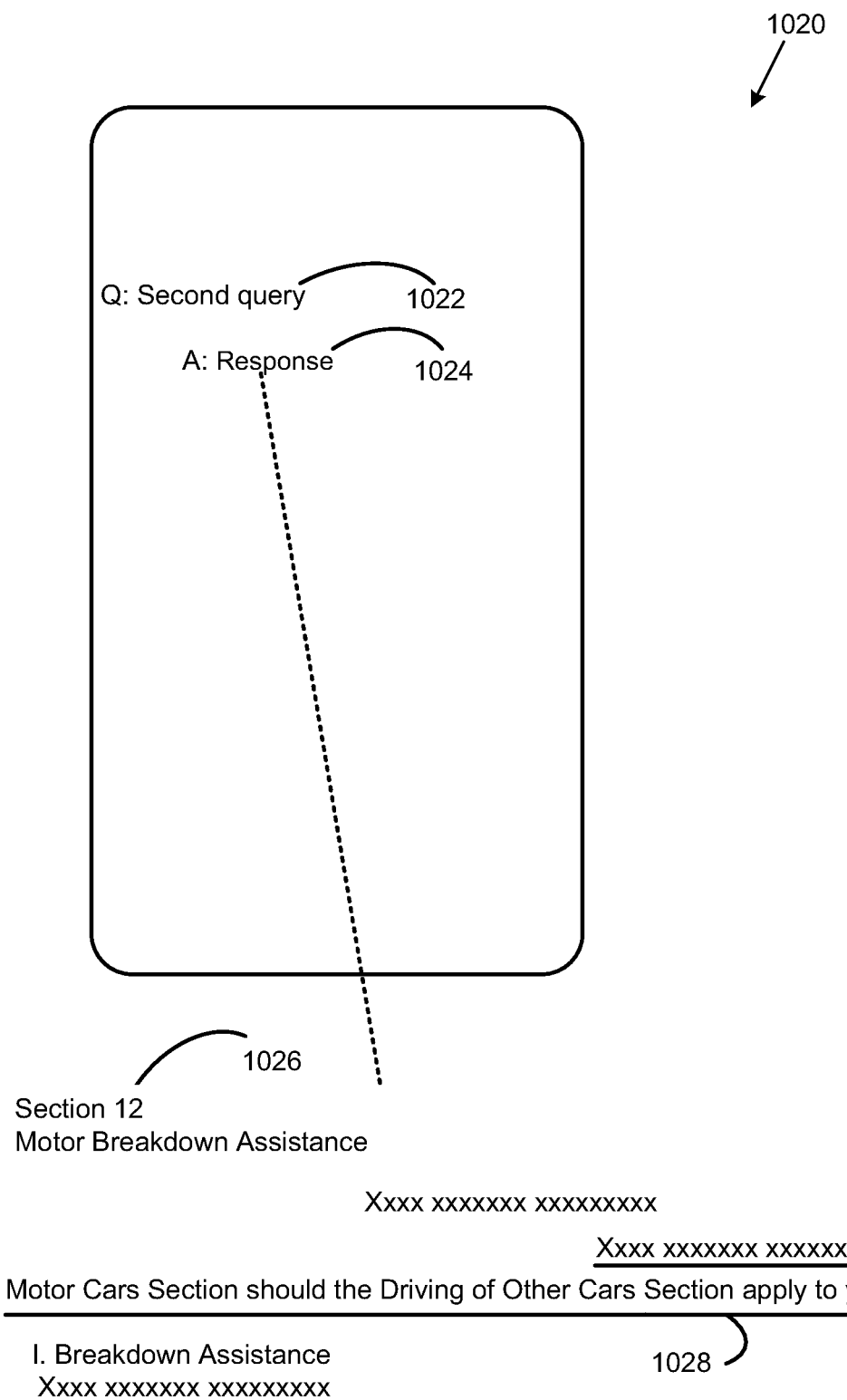

FIG. 10C shows another example 1020 of a second query 1022 that is similarly analyzed to provide the relevant information in a well-framed response that can mimic responses provided by human operators. The second query 1022 is analyzed to obtain the POS data and the key phrases. The second query 1022 can include a question that, "I'm driving my friend's car and the car breaks down. Will I get break down assistance?" Therefore, "my friend's car" and "breakdown assistance" are identified as the key phrases from the second query 1022, When applied over the pertinent input document, the nouns and noun phrases can map to the appropriate section e.g., Section 12 of the input document and the relevant sub-section. Again, topic modeling is used to identify Section 12 entitled "Motor Breakdown Assistance" as the relevant section. Semantic understanding/similarity techniques are employed to determine that "My friend's car" implies 'not my car'. The example identified sub-section is shown at 1026 which can state that, "The benefits set out here apply only to the island of US. For Us to provide any benefits You must call for assistance and get approval on the numbers below. This Motor Breakdown Assistance cover does not apply to any car that you may drive under the Driving of Other Motor Cars Section should the Driving of Other Cars Section apply to you. I. Breakdown Assistance—If Your Car is immobilized as a result of an accident, electrical or mechanical breakdown, fire, theft or any attempt at theft, malicious damage, punctures that require assistance, lost keys, stolen keys and keys broken in the lock or locked in Your Car, We will arrange and pay for the following benefits:".

The MRC model 162 identifies the relevant the sentence 1028 which states that, "This Motor Breakdown Assistance cover does not apply to any car that you may drive under the Driving of Other Motor Cars Section should the Driving of Other Cars Section apply to you," as the pertinent sentence to generate the response 1024. The response 1024 can state that, "The policy does not cover motor side assistance for driving other motor cars".

Figure 10D:
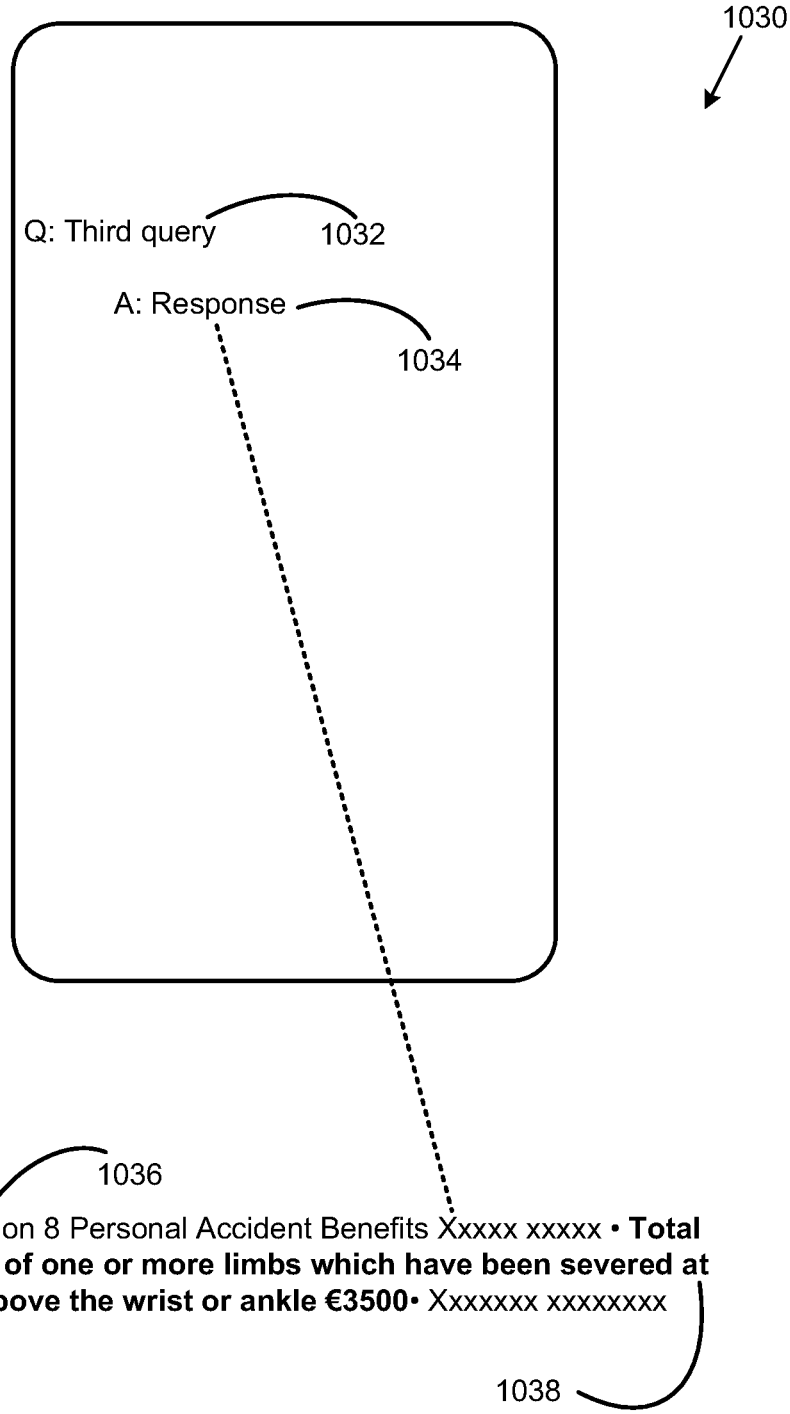

FIG. 10D shows yet another example 1030 of a third query 1032 that is analyzed and relevant information is provided in accordance with the examples disclosed herein. The third query 1032 which enquires, "What is the policy coverage if I lost my hands in an accident?" is analyzed to obtain the POS data and the key phrases. Therefore, "lost my hands" and "accident" are identified as the key phrases from the third query 1032. When applied over the pertinent document, the nouns and noun phrases can map to the appropriate section e.g., Section 8 of the input document and the relevant sub-section. Again, topic modeling is used to identify Section 8 entitled "Personal Accident Benefits" as the relevant section which can state that, "We will pay one of the following benefits if You or Your Spouse suffer accidental bodily injury in direct connection with Your Car and if within 3 months of the accident, the injury is the sole cause of: Benefit•Death €7000•Total and irrecoverable loss of sight of both eyes €6000•Total loss of one or more limbs which have been severed at or above the wrist or ankle €3500•Total and irrecoverable loss of sight of one eye €3500". Semantic understanding/similarity techniques are employed to determine that "I" relates to personal and "hands" are synonymous with "limbs". The example identified sub-section is shown at 1036, The MRC model 162 identifies the relevant the sentence 1038 which states that, "Total loss of one or ore limbs which have been severed at or above the wrist or ankle €3500", as the pertinent sentence to generate the response 1034 giving the details of the policy and payment. The response 1034 may state that, "The policy coverage if you lost your hands in an accident is €3500, we will pay the benefit, provided: the policy is in the name of an individual."

FIG. 11 shows an example of the administrative GUI 132 that is used as an explainable AI page 1100 for administrative users for validating the responses produced by the question answering system 100. On the left-hand side (LHS), the query 1102 from the end-user 190 and the section identified as relevant to the query 1102 and the response 1104 that was provided are highlighted. On the right-hand side (RHS), the sentences 1106 that were identified as relevant are highlighted. In an example, the GUIs shown to the end-user 190 can also be viewed by the administrative user 194. However, when viewed under the administrative user profile, the GUI providing the answers can include a link, which when selected by the administrative user 194 can display the explainable AI page 1100 which provides a justification from the domain-specific documents 120 for the answers provided to the end-users.

Figure 12:
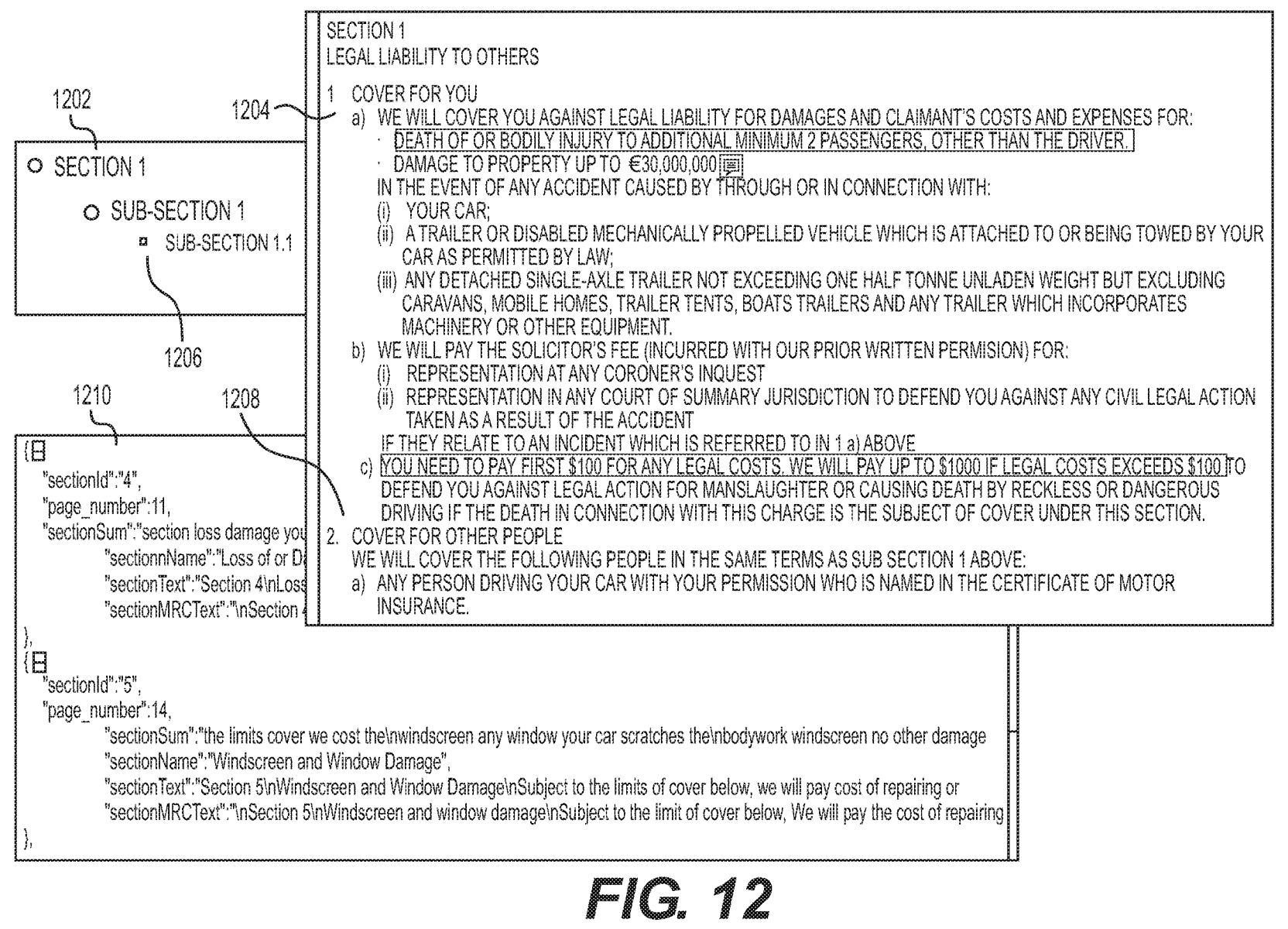

FIG. 12 shows examples of informational elements in the domain-specific documents and the data structures preserving the hierarchy of the informational elements according to the examples disclosed herein. As mentioned above, informational elements 1202 such as one or more of sections and sub-sections as shown in the document 1204 are identified based, for example, on the indents 1206, bullets or numbering 1208, etc. An example data structure 1210 in JSON that is built to store the information from a domain-specific document while preserving the hierarchy of the domain-specific document is also shown by way of illustration and not limitation. More particularly, the data structures include tags that further include document metadata such as the identifiers for each page, each section and sub-section of the domain-specific documents 120. For example, the example data structure 1210 includes javascript tags such as "sectionId", "page_pumber", "sectionSum", "sectionName" etc. which identify the corresponding information from the associated domain-specific document.

Figure 13:
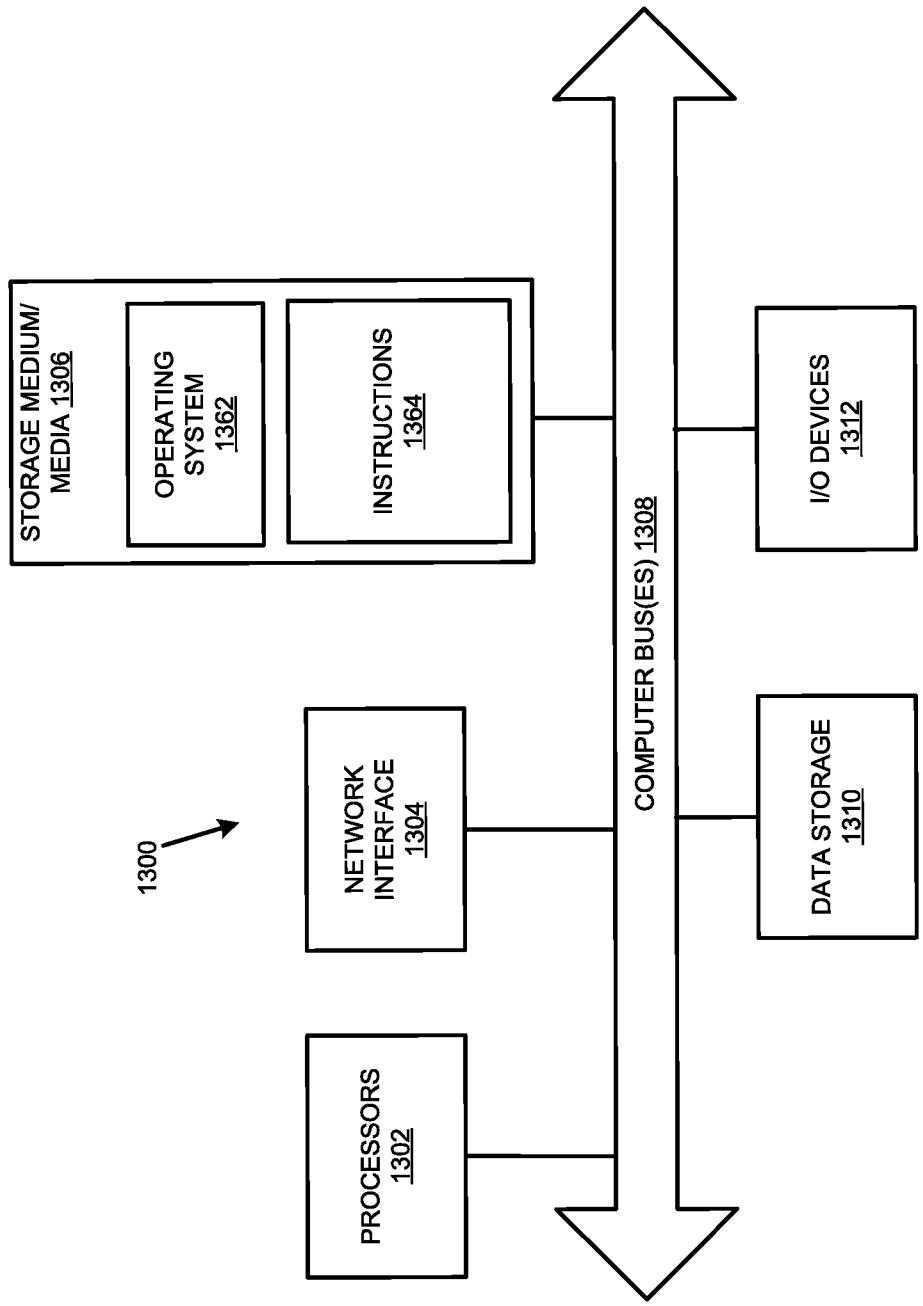
FIG. 13 illustrates a computer system that may be used to implement the domain-specific question answering system.

FIG. 13 illustrates a computer system 1300 that may be used to implement the question answering system 100. More particularly, computing machines such as desktops, laptops, smartphones, tablets and wearables which may be used to generate or access the data from the question answering system 100 may have the structure of the computer system 1300. The computer system 1300 may include additional components not shown and that some of the process components described may be removed and/or modified. In another example, a computer system 1300 can sit on external-cloud platforms such as Amazon Web Services, AZURE® cloud or internal corporate cloud computing clusters, or organizational computing resources, etc.

The computer system 1300 includes processor(s) 1302, such as a central processing unit, ASIC or other type of processing circuit, input/output devices 1312, such as a display, mouse keyboard, etc., a network interface 1304, such as a Local Area Network (LAN), a wireless 802.11x LAN, a 3G or 4G mobile WAN or a WiMax WAN, and a computer-readable medium 1306. Each of these components may be operatively coupled to a bus 1308. The computer-readable medium 1306 may be any suitable medium that participates in providing instructions to the processor(s) 1302 for execution. For example, the processor-readable medium 1306 may be non-transitory or non-volatile medium, such as a magnetic disk or solid-state non-volatile memory or volatile medium such as RAM. The instructions or modules stored on the processor-readable medium 1306 may include machine-readable instructions 1364 executed by the processor(s) 1302 that cause the processor(s) 1302 to perform the methods and functions of the question answering system 100.

The question answering system 100 may be implemented as software stored on a non-transitory processor-readable medium and executed by the one or more processors 1302. For example, the processor-readable medium 1306 may store an operating system 1362, such as MAC OS, MS WINDOWS, UNIX, or LINUX, and code 1364 for the question answering system 100. The operating system 1362 may be multi-user, multiprocessing, multitasking, multi-threading, real-time and the like. For example, during runtime, the operating system 1362 is running and the code for the question answering system 100 is executed by the processor(s) 1302.

The computer system 1300 may include a data storage 1312, which may include non-volatile data storage. The data storage 1310 stores any data used by the question answering system 100. The data storage 1310 may be used to store the queries from the end-users, the responses provided to the end-users, the domain-specific ontology 154, the data structures 152, and other data that is used the question answering system 100.

The network interface 1304 connects the computer system 1300 to internal systems for example, via a LAN. Also, the network interface 1304 may connect the computer system 1300 to the Internet. For example, the computer system 1300 may connect to web browsers and other external applications and systems via the network interface 1304.

What has been described and illustrated herein is an example along with some of its variations. The terms, descriptions, and figures used herein are set forth by way of illustration only and are not meant as limitations, Many variations are possible within the spirit and scope of the subject matter, which is intended to be defined by the following claims and their equivalents.

What is claimed is:

1. A system comprising:
   at least one processor;
   a non-transitory processor-readable medium storing machine-readable instructions that cause the processor to:
   build a domain-specific knowledge base, the domain-specific knowledge base including:
   a domain-specific ontology, and
   one or more data structures that preserve hierarchies of hierarchical informational structures in domain-specific documents,
   the domain-specific documents containing information for responding to users' questions,
   where the hierarchical informational structures include sections and sub-sections of the domain-specific documents;
   receive a question from one of the users;
   extract features from the question,
   the extracted features including parts of speech, and
   the parts of speech comprising words included in the question;
   extract key phrases from the question, the key phrases including one or more of the extracted features;
identify at least one of the one or more data structures that include information responsive to the question based on the key phrases,
wherein the data structures map to at least one relevant section, and one or more sub-sections of the relevant section of the domain-specific documents;
identify a paragraph within the one or more sub-sections, the paragraph including an answer to the question,
wherein the paragraph is identified using one or more of topic modeling and semantic similarity techniques;
determine one or more sentences from the paragraph that include an answer to the question, where the one or more sentences are determined by a pre-trained machine reading comprehension (MRC) model;
generate a tree structure of the one or more sentences containing the answer wherein the tree structure arranges a subject, an object and a predicate from the one or more sentences in a hierarchical format;
compose a natural language response to the question,
wherein the natural language response includes the answer provided in the one or more sentences,
the natural language response being generated by substituting terms of the one or more sentences in the tree structure with terminology from the question and in accordance with a set of rules that enable arranging the subject, the object, and the predicate within the response; and
provide the natural language response via a user interface.

2. The automatic question answering system of claim 1, the non-transitory processor-readable medium storing further machine-readable instructions that cause the processor to:
log the question and the natural language response to a conversational log.

3. The automatic question answering system of claim 1, where to build the domain-specific knowledge base, the processor is to:
extract text from the domain-specific documents using optical character recognition (OCR) and natural language processing (NLP); and
preprocessing the extracted text,
the preprocessing removing stop words, punctuation, and white spaces.

4. The automatic question answering system of claim 1, to build the domain-specific knowledge base the processor is to:
determine various font sizes used in the domain-specific documents;
and
identify sections including the relevant section and sub-sections of each of the sections based on the font sizes.

5. The automatic question answering system of claim 1, wherein to build the domain-specific knowledge base the processor is to:
identify additional informational elements,
the additional informational elements including lists based on font sizes used in the domain-specific documents; and
configure the data structures as Java Script Notation (JSON) structures; and
store within the JSON structures, metadata indicative of the hierarchies of the informational elements within the domain-specific documents.

6. The automatic question answering system of claim 1, wherein to build the domain-specific knowledge base the processor is to:
access one or more websites via a script,
the websites including additional domain-specific terminology and abbreviations of the domain-specific terminology.

7. The automatic question answering system of claim 1, to extract key phrases from the question the processor is to:
parsing and tokenizing text extracted from the domain-specific documents using a natural language tool kit (NLTK).

8. The automatic question answering system of claim 1, wherein to map the relevant section and the one or more sub-sections the processor is to:
identify the sections within the data structures using topic modeling techniques; and
obtain matches between the key phrases and the sections using word matching and semantic similarity techniques.

9. The automatic question answering system of claim 1, wherein to determine the sentences from the paragraph the processor is to:
provide the question and the paragraph to the pre-trained machine-readable comprehension model which includes a Bi-Directional Attention Flow (BIDAF) model.

10. The automatic question answering system of claim 9, wherein to determine the sentences from the paragraph the processor is to:
determine the sentences in the paragraph containing the answer to the question based on similarities obtained between words of the question and each of the sentences in the paragraph at an attention flow layer of the BIDAF model.

11. The automatic question answering system of claim 1, wherein to frame the natural language response to the question from the paragraph the processor is to:
generate the tree structure by employing the set of rules;
generate the response via the arrangement wherein one or more of the subject, the object and the predicate include the semantically similar terms from the question.

12. A method comprising:
receiving a plurality of domain-specific documents;
extracting text from the plurality of domain-specific documents;
identifying hierarchical informational elements in the domain-specific documents, wherein the hierarchical informational elements include at least sections and sub-sections;
building data structures,
the data structures storing information from the domain-specific documents, and the storing preserving a hierarchical arrangement of the hierarchical informational elements from the domain-specific documents;
building a knowledge base that includes at least the data structures and a domain-specific ontology;
extracting features and key phrases from a question received from an end-user;
identifying one or more of the data structures relevant to the question using the features and the key phrases;
providing the question and a context identified from the data structures to a machine-readable comprehension (MRC) model, wherein the context includes a paragraph from one or more of the sections and the sub-sections relevant to the question;

obtaining an output from the MRC model, where the output includes one or more relevant sentences extracted from the context that includes information responsive to the question;

generating a tree structure of the one or more relevant sentences containing the information responsive to the question, wherein the tree structure arranges a subject, an object and a predicate from the relevant sentences in a hierarchical format;

composing a response in a natural language to the question by including the information responsive to the question in the response wherein terms of the one or more relevant sentences in the tree structure are substituted with terminology from the question and by arranging the subject, the object, and the predicate within the response in accordance with a set of rules; and providing the response to the end-user using a user interface.

13. The method of claim 12, further comprising:

storing the question and the response in a log; and providing an administrative user interface that enables validation of the response.

14. The method of claim 13, further comprising:

providing a link on the administrative user interface along with a display of the question and the response, where a selection of the link enables display of the one or more sections and sub-sections relevant to the question.

15. The method of claim 14, further comprising:

enabling display of the one or more sections and sub-sections with the relevant sentences within are highlighted.

16. The method of claim 12, further comprising:

further training the MRC model on domain-specific data sets.

17. The method of claim 12, further comprising:

configuring the knowledge base to access external websites for more information that is not included in the data structures or the domain-specific ontology.

18. A non-transitory processor-readable storage medium comprising machine-readable instructions that cause a processor to:

build a domain-specific knowledge base that includes a domain-specific ontology and one or more data structures that preserve hierarchies of hierarchical informational elements in domain-specific documents containing information for responding to users' questions, where the hierarchical informational elements include sections and sub-sections of the domain-specific documents;

receive a question on behalf of one of the users;

extract features from the question, where the extracted features include parts of speech of words included in the question;

extract key phrases from the question, where the key phrases include one or more of the extracted features;

identify one or more of the data structures that include information responsive to the question based on the key phrases, wherein the data structures map to at least one relevant section, one or more sub-sections of the relevant section of the domain-specific documents;

identify a paragraph within the one or more sub-sections that includes an answer to the question, wherein the paragraph is identified using one or more of topic modeling and semantic similarity techniques;

determine one or more sentences from the paragraph that include an answer to the question, where the sentences are determined by a pre-trained machine-readable comprehension (MRC) model;

generate a tree structure of the one or more sentences containing the answer wherein the tree structure arranges a subject, an object and a predicate from the sentences in a hierarchical format;

compose a natural language response to the question, the natural language response includes the answer provided in the one or more sentences, where the response is generated by substituting terms of the one or more sentences in the tree structure with terminology from the question and in accordance with a set of rules that enable arranging a subject, an object and a predicate within the response; and provide the natural language response via a user interface.

19. The non-transitory processor-readable storage medium of claim 18, comprising further machine-readable instructions that cause the processor to:

store the question and the natural language response in a log; and provide an administrative user interface that enables validation of the natural language response.

20. The automatic question answering system of claim 1, the non-transitory processor-readable medium storing further machine-readable instructions that cause the processor to:

enable displaying a explainable Artificial Intelligence (AI) page that provides a justification from the domain specific documents for the answer provided in response to the question.

* * * * *